(12) United States Patent
Javidnia et al.

(10) Patent No.: US 10,462,445 B2
(45) Date of Patent: Oct. 29, 2019

(54) SYSTEMS AND METHODS FOR ESTIMATING AND REFINING DEPTH MAPS

(71) Applicant: FotoNation Limited, Galway (IE)

(72) Inventors: Hossein Javidnia, Galway (IE); Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 34 days.

(21) Appl. No.: 15/654,693

(22) Filed: Jul. 19, 2017

(65) Prior Publication Data

US 2018/0027224 A1 Jan. 25, 2018

Related U.S. Application Data

(60) Provisional application No. 62/364,263, filed on Jul. 19, 2016.

(51) Int. Cl.
| | |
|---|---|
| G06K 9/00 | (2006.01) |
| H04N 13/128 | (2018.01) |
| G06T 5/20 | (2006.01) |
| G06T 7/593 | (2017.01) |
| H04N 13/257 | (2018.01) |
| H04N 13/271 | (2018.01) |
| H04N 13/239 | (2018.01) |
| G06K 9/46 | (2006.01) |
| G06K 9/62 | (2006.01) |
| H04N 13/00 | (2018.01) |

(52) U.S. Cl.
CPC ......... *H04N 13/128* (2018.05); *G06K 9/4604* (2013.01); *G06K 9/6212* (2013.01); *G06T 5/20* (2013.01); *G06T 7/593* (2017.01); *H04N 13/239* (2018.05); *H04N 13/257* (2018.05); *H04N 13/271* (2018.05); *G06T 2207/10024* (2013.01); *G06T 2207/10028* (2013.01); *G06T 2207/20032* (2013.01); *G06T 2207/30256* (2013.01); *G06T 2207/30261* (2013.01); *H04N 2013/0081* (2013.01)

(58) Field of Classification Search
CPC .......... G06T 7/593; G06T 2207/10028; G06T 2207/10012; G06T 2207/20032; G06T 2207/20192; G06K 9/4604; G06K 9/6212
See application file for complete search history.

(56) References Cited

U.S. PATENT DOCUMENTS

| | | |
|---|---|---|
| 7,486,820 B2 | 2/2009 | Grady |
| 8,885,890 B2 | 11/2014 | Tardif |
| (Continued) | | |

OTHER PUBLICATIONS

Fang, "What is Random Walk with Restart (RWR)?", dnet 1.0.7; supfam.org/dnet/faq-FAQ5.html, Jul. 21, 2015.
(Continued)

*Primary Examiner* — Li Liu

(57) ABSTRACT

A method for improving accuracy of depth map information derived from image data descriptive of a scene. In one embodiment Mutual Feature Map data are created based on initial disparity map data values and the image data descriptive of the scene. The Mutual Feature Map data are applied to create a series of weighting functions representing structural details that can be transferred to the first disparity values to restore degraded features or replace some of the first disparity values with values more representative of structural features present in the image data descriptive of the scene.

20 Claims, 24 Drawing Sheets

(56) References Cited

U.S. PATENT DOCUMENTS

| | | |
|---|---|---|
| 2003/0231792 A1 | 12/2003 | Zhang et al. |
| 2004/0151380 A1 | 8/2004 | Jeong et al. |
| 2004/0223640 A1 | 11/2004 | Bovyrin |
| 2005/0123190 A1 | 6/2005 | Zhang et al. |
| 2005/0163366 A1 | 7/2005 | Zhang et al. |
| 2007/0286476 A1* | 12/2007 | Kim ............... G06K 9/32 382/154 |
| 2008/0002878 A1 | 1/2008 | Meiyappan |
| 2008/0037862 A1 | 2/2008 | Jeon et al. |
| 2009/0041336 A1 | 2/2009 | Ku et al. |
| 2009/0141967 A1* | 6/2009 | Hattori ............ G06K 9/6224 382/154 |
| 2010/0128972 A1 | 5/2010 | Koizumi et al. |
| 2010/0220932 A1 | 9/2010 | Zhang et al. |
| 2011/0188740 A1 | 8/2011 | Lim et al. |
| 2011/0285701 A1 | 11/2011 | Chen et al. |
| 2012/0008857 A1 | 1/2012 | Choi |
| 2012/0155747 A1* | 6/2012 | Hwang ............ G06T 7/593 382/154 |
| 2012/0163703 A1 | 6/2012 | Lim et al. |
| 2012/0163704 A1 | 6/2012 | Chang et al. |
| 2012/0195493 A1 | 8/2012 | Lin et al. |
| 2012/0237114 A1 | 9/2012 | Park et al. |
| 2013/0089269 A1 | 4/2013 | Barnum et al. |
| 2013/0127995 A1 | 5/2013 | Lee |
| 2013/0129190 A1 | 5/2013 | Cohen et al. |
| 2013/0136339 A1 | 5/2013 | Moon et al. |
| 2013/0208975 A1 | 8/2013 | Hsu |
| 2013/0215234 A1 | 8/2013 | Lim et al. |
| 2013/0314409 A1 | 11/2013 | Guseva |
| 2014/0015923 A1 | 1/2014 | Au et al. |
| 2014/0177927 A1 | 6/2014 | Shieh et al. |
| 2014/0205181 A1 | 7/2014 | Woodfill et al. |
| 2014/0219549 A1 | 8/2014 | Choi et al. |
| 2014/0241587 A1 | 8/2014 | Jung et al. |
| 2014/0241612 A1 | 8/2014 | Rhemann et al. |
| 2014/0270485 A1* | 9/2014 | Kauff ............... G06T 5/002 382/154 |
| 2014/0314309 A1 | 10/2014 | Lee |
| 2015/0010230 A1 | 1/2015 | Zhou |
| 2015/0063680 A1 | 3/2015 | Liu et al. |
| 2016/0019437 A1 | 1/2016 | Choi et al. |
| 2016/0037121 A1 | 2/2016 | Chang et al. |
| 2016/0063759 A1 | 3/2016 | Choi |
| 2016/0171706 A1 | 6/2016 | Somanath |
| 2016/0173852 A1 | 6/2016 | Moon et al. |
| 2016/0188994 A1 | 6/2016 | Wu et al. |
| 2016/0188995 A1 | 6/2016 | Somanath et al. |
| 2016/0191898 A1 | 6/2016 | Xu et al. |
| 2016/0205341 A1 | 7/2016 | Hollander et al. |
| 2016/0210751 A1 | 7/2016 | Feng et al. |
| 2016/0224856 A1 | 8/2016 | Park et al. |
| 2016/0234474 A1 | 8/2016 | Zhang et al. |
| 2016/0284090 A1* | 9/2016 | Huang ............. G06T 7/593 |
| 2017/0019654 A1* | 1/2017 | Nishiyama ........ G06T 5/002 |
| 2018/0061068 A1* | 3/2018 | Jiao ................. G06T 5/50 |
| 2018/0091798 A1* | 3/2018 | Chang ............. H04N 13/271 |

OTHER PUBLICATIONS

Shen et al., "Mutual-structure for joint filtering", Proc. IEEE Int. Conf. Comput. Vis. (ICCV), pp. 3406-3414, Dec. 2015.

Hamzah, "Review Article: Literature Survey on Stereo Vision Disparity Map Algorithms", Journal of Sensors, vol. 2016 (2016), Article ID 8742920, 23 pages; http://dx.doi.org/10.1155/2016/8742920; 2016.

Huang et al., "Image-guided non-local dense matching with three-steps optimization", Proc. ISPRS Ann. Photogramm. Remote Sens. Spatial Inf. Sci., vol. III-3, pp. 67-74, 2016.

Zbontar et al., "Stereo matching by training a convolutional neural network to compare image patches", J. Mach. Learn. Res., vol. 17, No. 1, pp. 2287-2318, Jan. 2016.

Fusiello, "Stereo Matching: An Overview", profs.sci.univr.it/~fusiello, date not available.

Jordan et al., "Usings CNNs to Estimate Depth from Stereo Imagery", Stanford 178 Report; http://technodocbox.com/3D_Graphics/75964810-Usings-cnns-to-estimate-depth-from-stereo-imagery.html, date not available.

Knutsson et al., "Normalized and differential convolution", Proc. IEEE Comput. Soc. Conf. Comput. Vis. Pattern Recognit. (CVPR), pp. 515-523, Jun. 1993.

Zabih et al., "Non-parametric local transforms for computing visual correspondence", Proc. 3rd Eur. Conf. Comput. Vis. Comput. Vis. (ECCV), pp. 151-158, May 1994.

Arce, "A general weighted median filter structure admitting negative weights", IEEE Trans. Signal Process., vol. 46, No. 12, pp. 3195-3205, Dec. 1998.

Scharstein et al., ""A Taxonomy and Evaluation of Dense Two-Frame Stereo Correspondence Algorithms"", IEEE (SMBV01) 0-7695-1327-1/01; Int. J. Comput. Vis., vol. 47, No. 1, pp. 7-42, Apr. 2002.

Scharstein et al., "High-Accuracy Stereo Depth Maps Using Structured Light", IEEE (CVPR'03) 1063-6919/03; Proc. IEEE Comput. Soc. Cont Comput. Vis. Pattern Recognit., vol. 1, pp. 1-195-1-202, Jun. 2003.

Sun, et al., "Stereo Matching Using Belief Propagation", IEEE Transactions on Pattern Analysis and Machine Intelligence, vol. 25, No. 7, Jul. 2003.

Grady et al., "Multi-Label Image Segmentation for Medical Applications Based on Graph-Theoretic Electrical Potentials", Proceedings of the 8th ECCV04, Workshop on Computer Vision Approaches to Medical Image Analysis and Mathematical Methods in Biomedical Image Analysis, May 15, 2004, Prague, Czech Republic, Springer-Verlag.

Szeliski, "Stereo Matching", U Washington, Computer Vision CSE576, Spring 2005.

Hirschmuller, "Accurate and efficient stereo processing by semi-global matching and mutual information", Proc. IEEE Comput. Soc. Conf. Comput. Vis. Pattern Recognit. (CVPR), vol. 2, pp. 807-814, Jun. 2005.

Grady, "Multilabel Random Walker Image Segmentation Using Prior Models", Proceedings of the 2005 IEEE Computer Society Conference on Computer Vision and Pattern Recognition, vol. 1, p. 763-770, June, San Diego; (Jun. 2005).

Manana, "Similarity Measures", reference not available, Oct. 7, 2005.

Tong et al., "Fast Random Walk with Restart and Its Applications", Research Showcase @ Carnegie Mellon University Dec. 2006; repository.cmu.edu/compsci.

Grady, "Random Walks for Image Segmentation", IEEE Transactions on Pattern Analysis and Machine Intelligence, vol. 28, No. 11, Nov. 2006.

Hirschmuller et al., "Evaluation of Cost Functions for Stereo Matching", IEEE Conference on Computer Vision and Pattern Recognition, 2007. CVPR '07, Jun. 17-22, 2007.

"Kim et al., ""Generative Image Segmentation Using Random Walks with Restart"", ECCV 2008, Part III, LNCS 5304, pp. 264-275, 2008.c Springer-Verlag Berlin Heidelberg 2008".

Xu et al., "Stereo Matching: An Outlier Confidence Approach", European Conference on Computer Vision, 2008.

Kim et al., "A Probabilistic Model for Correspondence Problems Using Random Walks with Restart", ACCV 2009, Part III, LNCS 5996, pp. 416-425, 2010, c Springer-Verlag Berlin Heidelberg 2010; accv2009_thkim.

Chowdhury et al., "A new approach for disparity map determination", Daffodil International University Journal of Science and Technology, vol. 4, Issue 1, Jan. 2009; 4348-15995-1-PB.

"Yang et al., ""Stereo Matching with Color-WeightedCorrelation, Hierarchical Belief Propagation,and Occlusion Handling"", IEEE 0162-8828/09; IEEE Trans. Pattern Anal. Mach. Intell., vol. 31, No. 3, pp. 492-504, Mar. 2009."

Suri et al., "Combining mutual information and scale invariant feature transform for fast and robust multisensor SAR image registration", reference not available, 2009.

Mordohai, "The Self-Aware Matching Measure for Stereo", Computer Vision, 2009 IEEE.

(56) References Cited

OTHER PUBLICATIONS

Szeliski, "Chapter 10 Stereo correspondence", Computer Vision: Algorithms and Applications (Apr. 27, 2009 draft); soe.rutgers.edu-meerx.
Belongie et al., "Distributions and Histograms of X", CSE 252C: Computer Vision III, Lecture 3; 1Department of Computer Science and Engineering, University of California, San Diego. Aug. 10, 2009.
Andrews et al., "Fast Random Walker with Priors using Precomputation for Interactive Medical Image Segmentation", sfu_cs2010_07, 2010.
Ledig et al., "Efficient Computation of Joint Histograms and Normalized Mutual Information on CUDA Compatible Devices", HP-MICCAI, 2010.
He et al., "Guided Image Filtering", He K., Sun J., Tang X (2010) Guided Image Filtering. In: Daniilidis K, Maragos P., Paragios N. (eds) Computer Vision—ECCV 2010. ECCV 2010. Lecture Notes in Computer Science, vol. 6311. Springer, Berlin, Heidelberg.
Geiger et al., "Efficient Large-Scale Stereo Matching", Computer Vision—ACCV 2010: 10th Asian Conference on Computer Vision, Queenstown, New Zealand, Nov. 8-12, 2010; Proc. 10th Asian Conf. Comput. Vis. Comput. Vis. (ACCV), pp. 25-38, Nov. 2010.
Kozik et al., "Improving depth map quality with Markov random fields", Image Processing and Communications Challenges 3, Berlin, Germany:Springer, pp. 149-156, 2011.
Niclass et al., "A 100m-Range 10-Frame/s 340x96-PixelTime-of-Flight Depth Sensor in 0.18µm CMOS", IEEE 978-1-4577-0704-9; Proc. ESSCIRC (ESSCIRC), pp. 107-110, Sep. 2011.
Rhemann et al., "Fast Cost-Volume Filtering for Visual Correspondence and Beyond", Proc. IEEE Conf. Comput. Vis. Pattern Recognit. (CVPR), pp. 3017-3024, Jun. 2011.
Oh et al., "Probabilistic Correspondence Matching using Random Walk with Restart", abstract037, 2012.
Oh et al., "Probabilistic Correspondence Matching using Random Walk with Restart", BMVC, 2012.
Zhu et al., "An improved median filtering algorithm for image noise reduction", 2012 International Conference on Solid State Devices and Materials Science; Phys. Procedia, vol. 25, pp. 609-616, Apr. 2012.
"Niclass et al., ""Design and characterization of a 256x64-pixelsinglephoton imager in CMOS for a MEMS-based laser scanning time-of-flight sensor"", vol. 20, No. 11 / Optics Express 11863; Optics Express, vol. 20, pp. 11863-11881, May 21, 2012 2012."
Achanta et al., "SLIC superpixels compared to state-of-the-art superpixel methods", IEEE Trans. Pattern Anal. Mach. Intell., vol. 34, No. 11, pp. 2274-2282, Nov. 2012.
"Hermann et al., ""Iterative Semi-Global Matchingfor Robust Driver Assistance Systems""", ACCV 2012, Part III, LNCS 7726, pp. 465-478, 2013; Proc. 11th Asian Conf. Comput. Vis. Comput. Vis. (ACCV), pp. 465-478, Nov. 2012."
Mistry et al., Image Similarity based on Joint Entropy (Joint Histogram), Conference: International Conference on Advances in Engineering and Technology (ICAET—2013).
Akhavan et al., A framework for HDR stereo matching using multi-exposed images, HDRi2013—First International Conference and SME Workshop on HDR imaging (2013); pp. 1-4. 1, 2PubDat_ 217943.
Heo et al., "Joint depth map and color consistency estimation for stereo images with different illuminations and cameras", IEEE Trans. Pattern Anal. Mach. Intell., vol. 35, No. 5, pp. 1094-1106, May 2013.
Lo et al., "Depth map super-resolution via Markov random fields without texture-copying artifacts", Proc. IEEE Int. Conf. Acoust. Speech Signal Process. (ICASSP), pp. 1414-1418, May 2013.
Mistry et al., "Image Similarity based on Joint Entropy (Joint Histogram)", researchgate.net/publication/245025778_Image_Similarity_based_on_Joint_Entropy_Joint_Histogram, May 2013.
Herrera et al., "A Learned Joint Depth and Intensity Prior using Markov Random Fields", Proc. Int Cont 3D Vis. (3DV), pp. 17-24, Jun./Jul. 2013.
"Son, ""A Real-Time Stereo Matching Hardware Architecture Based on the AD Census""", International Journal of Multimedia and Ubiquitous Engineering vol. 8, No. 4, Jul. 2013".
Son et al., "A Real-Time Stereo Matching Hardware Architecture Based on the AD Census", International Journal of Multimedia and Ubiquitous Engineering vol. 8, No. 4, Jul. 2013.
Zhu, "Dense Stereo Matching with Robust Cost Functions and Confidence-based Surface Prior", Dissertation Technischen Universitat Munchen, Oct. 15, 2013.
Scharstein et al., "High-resolution stereo datasets with subpixel-accurate ground truth", Proc. 36th German Conf. Pattern Recognit. (GCPR), pp. 31-42, Sep. 2014.
Zheng et al., "Depth map upsampling using segmentation and edge information", Proc. 8th Int. Conf. Image Graph. (ICIG), pp. 116-126, Aug. 2015.
Barron et al., "Fast bilateral-space stereo for synthetic defocus", Proc. IEEE Cont Comput. Vis. Pattern Recognit. (CVPR), pp. 1-15, 2015.
Zhang et al., "MeshStereo: A global stereo model with mesh alignment regularization for view interpolation", Proc. IEEE Int. Conf. Comput. Vis. (ICCV), pp. 2057-2065, Dec. 2015.
Lee et al., "Robust stereo matching using adaptive random walk with restart algorithm", Image Vis. Comput., vol. 37, pp. 1-11, May 2015.

\* cited by examiner

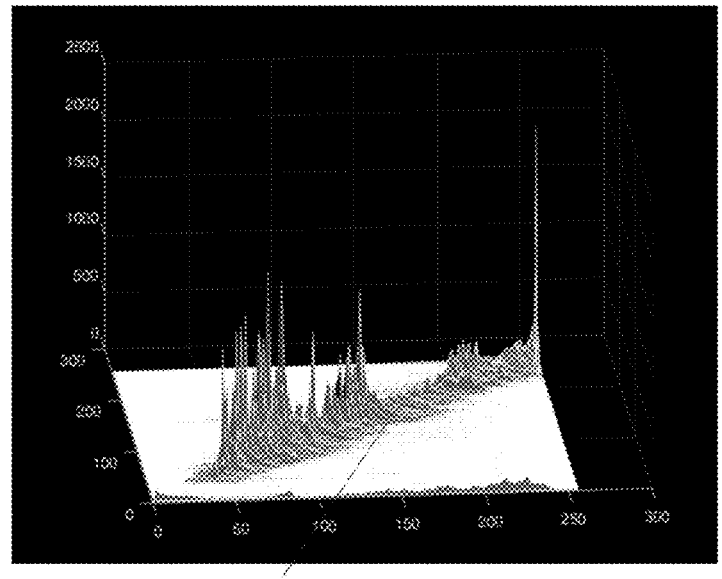
168 Fig. 6D
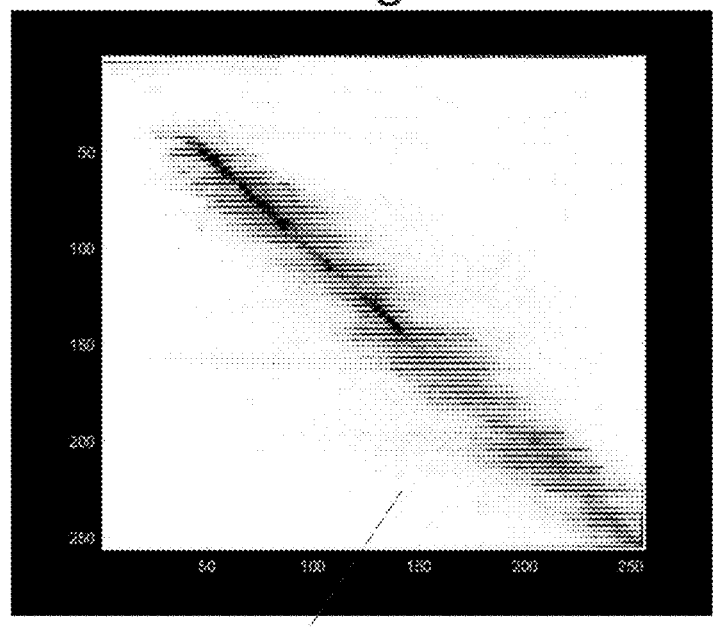
168 Fig. 6E

SYSTEMS AND METHODS FOR ESTIMATING AND REFINING DEPTH MAPS

CLAIM OF PRIORITY AND RELATED PATENTS AND APPLICATIONS

This application claims priority to provisional patent application Ser. No. 62/364,263, "Depth Map Post-Processing Approach Based on Adaptive Random Walk with Restart" filed 19 Jul. 2016 and is related to U.S. Pat. Nos. 7,916,897, 8,170,294, 8,934,680; 8,872,887, 8,995,715, 8,385,610, 9,224,034, 9,242,602, 9,262,807, 9,280,810, 9,398,209 and U.S. patent application Ser. No. 13/862,372, filed Apr. 12, 2013, and U.S. patent application Ser. No. 14/971,725, filed Dec. 16, 2015, and U.S. patent application Ser. No. 15/591,321, filed May 10, 2017, all of which are assigned to the assignee of the present application and hereby incorporated by reference.

FIELD OF THE INVENTION

This invention relates to processing methods and systems for estimating and refining depth maps and disclosed embodiments relate to processing techniques which bring optimized local matching costs to improved levels of speed and accuracy.

BACKGROUND OF THE INVENTION

Time critical machine vision applications require high levels of speed and accuracy in the matching algorithms which determine depth. Depth estimation is typically based on stereo correspondence, the difference in coordinates of corresponding pixels in stereo images. The difference in coordinate position between a pair of corresponding pixels is referred to as the disparity, and the assimilation of differences among pairs of corresponding pixels in stereo imagery is referred to as a depth map.

The accuracy of depth mapping is dependent on accurate identification of corresponding pixels while applications, such as automatic vehicle braking, require rapid execution. Satisfactory accuracy for real time responses can require rapid execution of data intensive, iterative computations.

Conventionally, estimating depth from imagery normally begins with application of a stereo matching algorithm to construct a disparity map from a pair of images taken of the same scene from different viewpoints. Typically, the two images are acquired at the same time with two cameras residing in the same lateral plane, although a depth map may also be determined from correspondence between images of a scene captured at different times provided that spatial differences occur between corresponding pixels in the lateral plane. Generally, for depth estimations, most of the pixels of interest in one image will have a corresponding pixel in the other image.

SUMMARY OF THE INVENTION

Embodiments of the present invention employ a stochastic approach comprising a combination of iterative refinements to generate an optimized disparity map. The figures illustrate an exemplary embodiment of a control system 10 which applies improved processing techniques in conjunction with matching algorithms to provide a more accurate disparity map at computation speeds suitable for real time applications.

While the invention can be practiced with numerous other matching algorithms, FIG. 1 illustrates application of a matching algorithm for pixel wise determination of initial matching costs. In this example, in which an Adaptive Random Walk with Reset (ARWR) algorithm is iteratively applied to optimize stereo matching, processing steps address discontinuities and occlusions, and provide additional filtering steps to enhance image registration. Optimized matching costs bring local matching to improved levels of speed and accuracy.

ARWR methods have previously been applied to solve the stereo correspondence problem. See, for example, S. Lee, et al., "*Robust stereo matching using adaptive random walk with restart algorithm,*" *Image and Vision Computing*, vol. 37, pp. 1-11 (2015). See, also, Hamzah and Ibrahim, "*Literature Survey on Stereo Vision Disparity Map Algorithms*" *Journal of Sensors*, Volume 2016 p. 6 (2016); and Oh, Changjae, Bumsub Ham, and Kwanghoon Sohn. "*Probabilistic Correspondence Matching using Random Walk with Restart.*" *BMVC*, pp. 1-10. 2012.

The system 10 incorporates a sequence of six major process steps, referred to as Processing Blocks: (1) Local Matching Processing Block 1; (2) Cost Aggregation Processing Block 2; (3) Optimization Processing Block 3 which iteratively applies a matching algorithm; (4) Mutual Structure Processing Block 4 which identifies structure common to the images; (5) Dynamic Joint Weighted Median Filter (DJWMF) Processing Block 5; and (6) Multi-Dimensional Convolution (MDC) Processing Block 6.

BRIEF DESCRIPTION OF THE FIGURES

Other aspects and advantages of the present invention will be more clearly understood by those skilled in the art when the following description is read with reference to the accompanying drawings wherein.

Figure 2A:
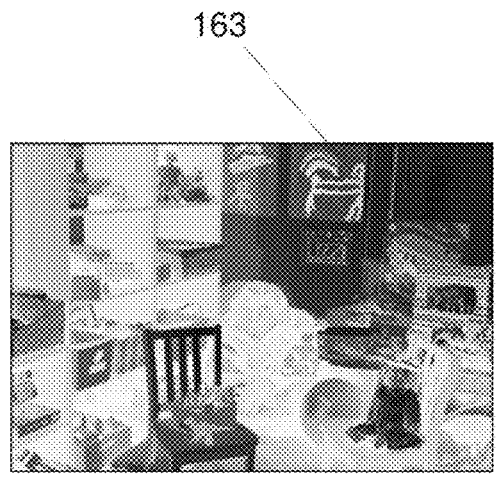
FIGS. 2A-L show an exemplary set of inter-related images resulting from intermediate steps of an exemplary multi-step depth estimation process according to the invention, based on Middlebury Benchmark stereo input RGB images "Playroom"
Figure 2B:
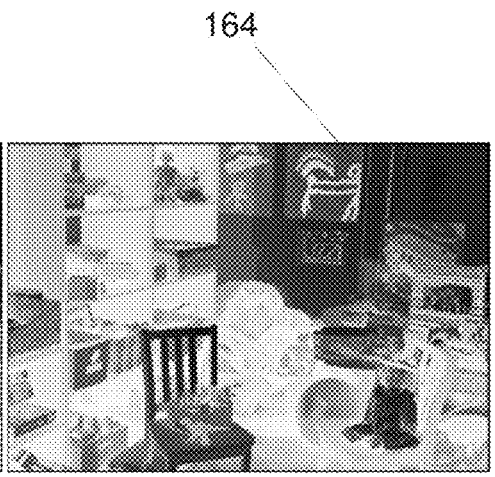
Figure 2C:
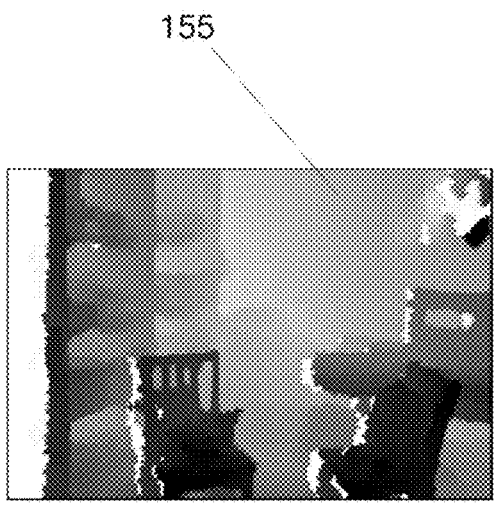
Figure 2D:
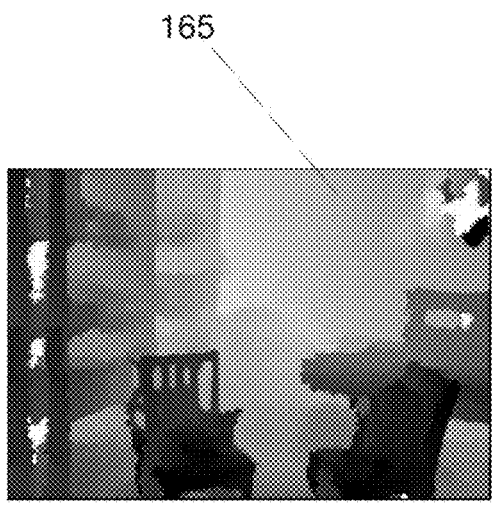
Figure 2E:
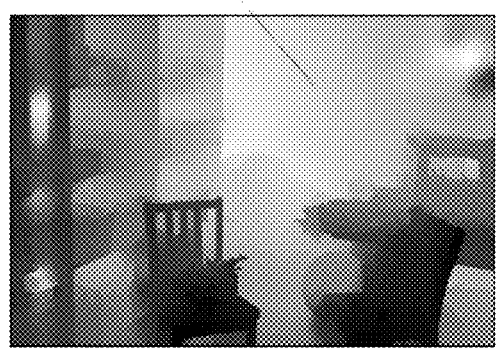
Figure 2F:
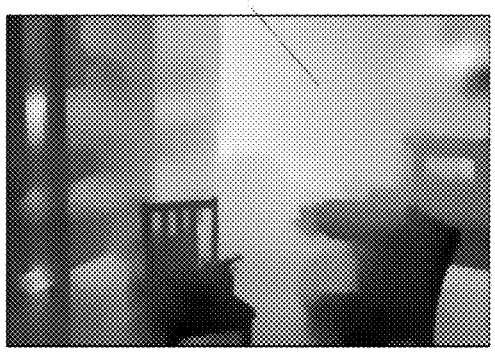
Figure 2G:
Figure 2H:
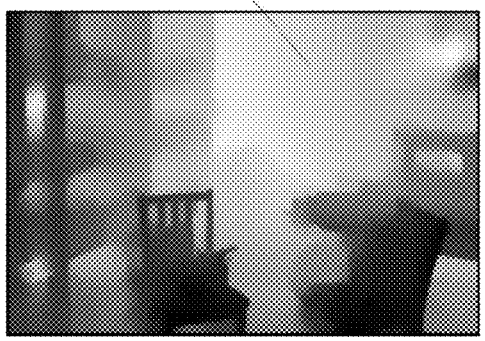
Figure 2I:
Figure 2J:
Figure 2K:
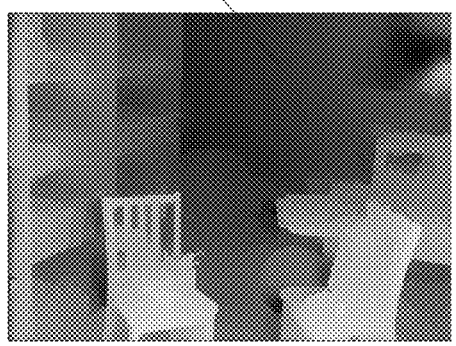
Figure 2L:
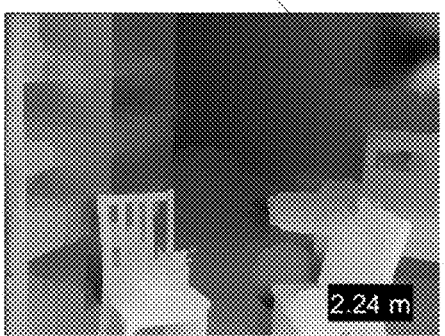
Figure 3A:
Figure 3B:
Figure 3C:
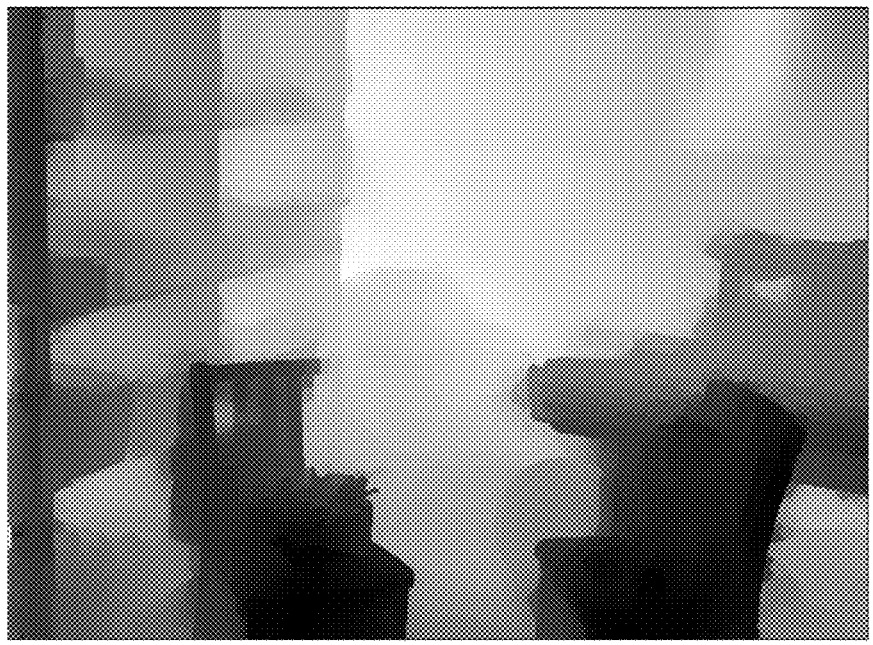
Figure 3D:
Figure 4:
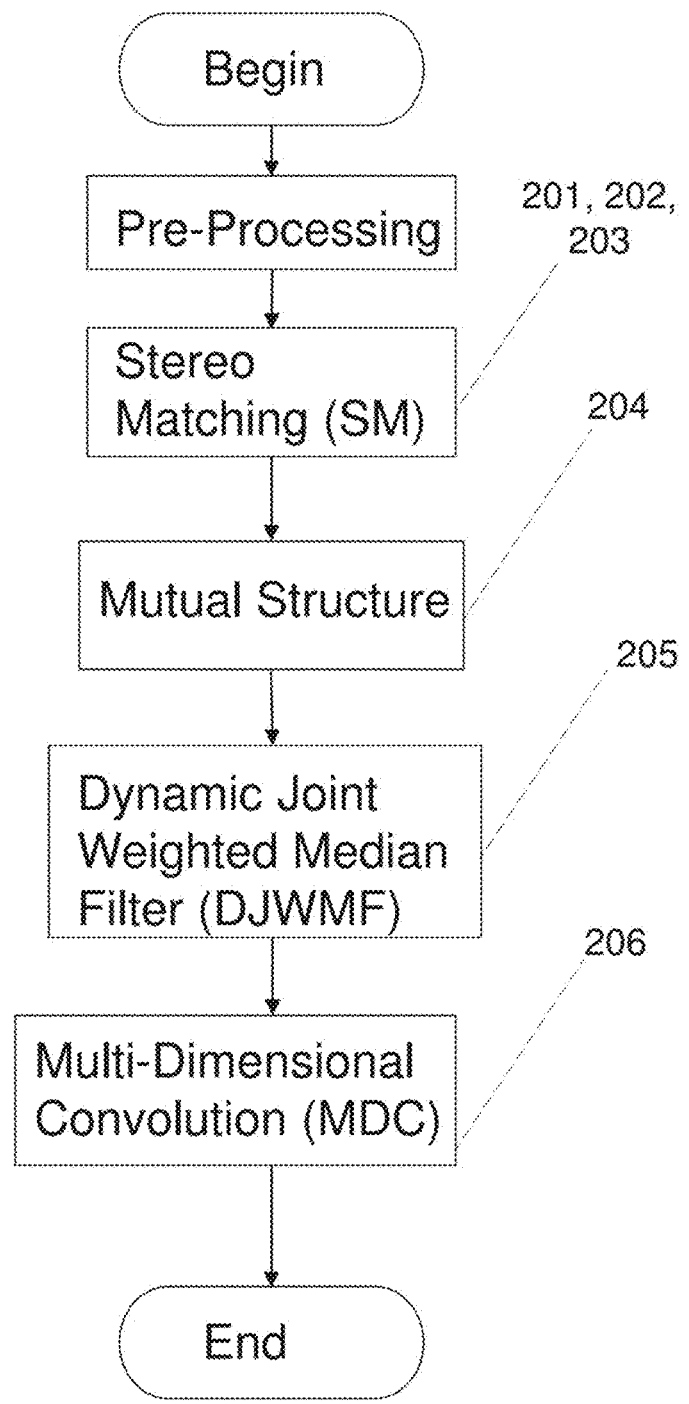
Figure 5:
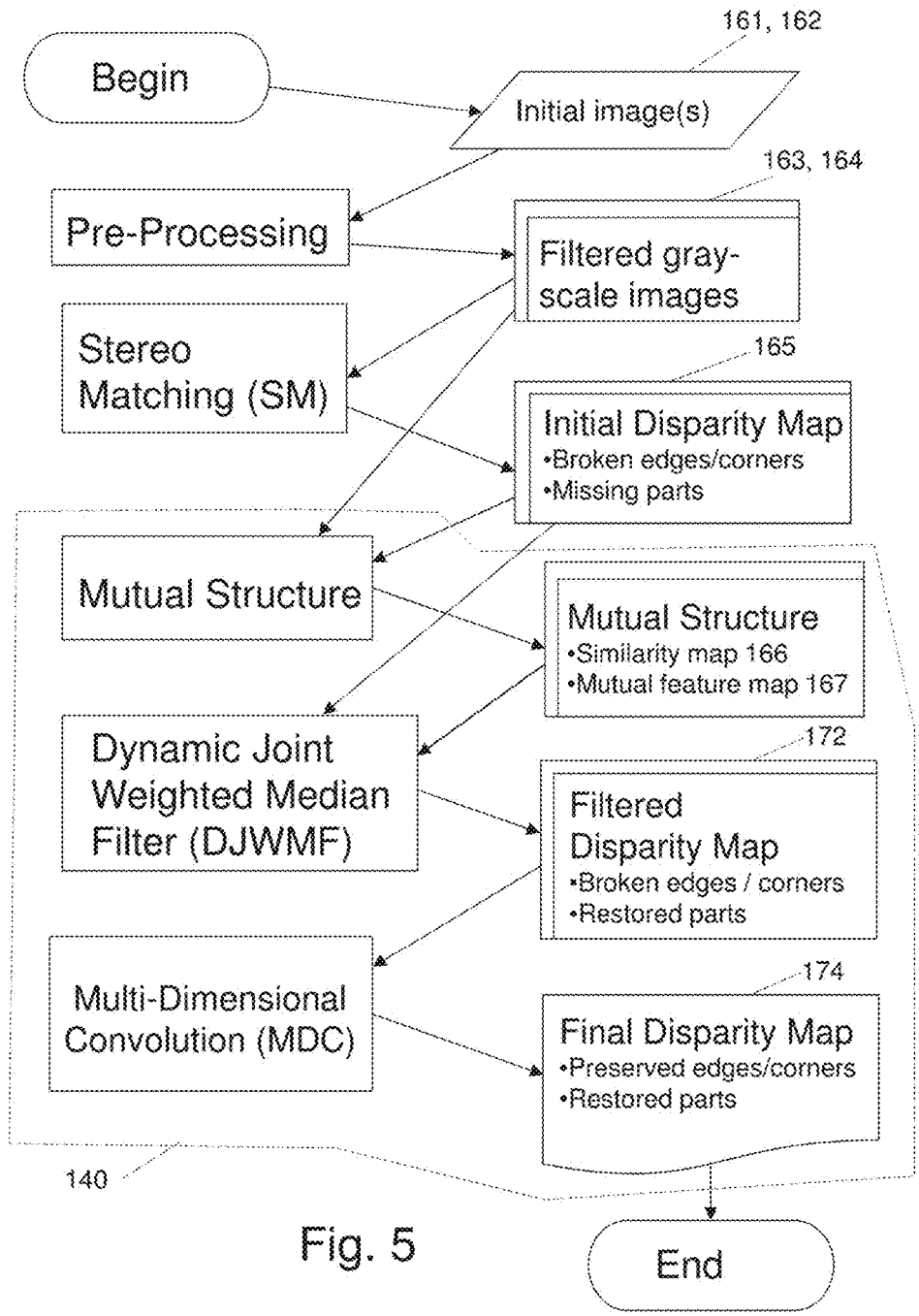
Figure 6A:
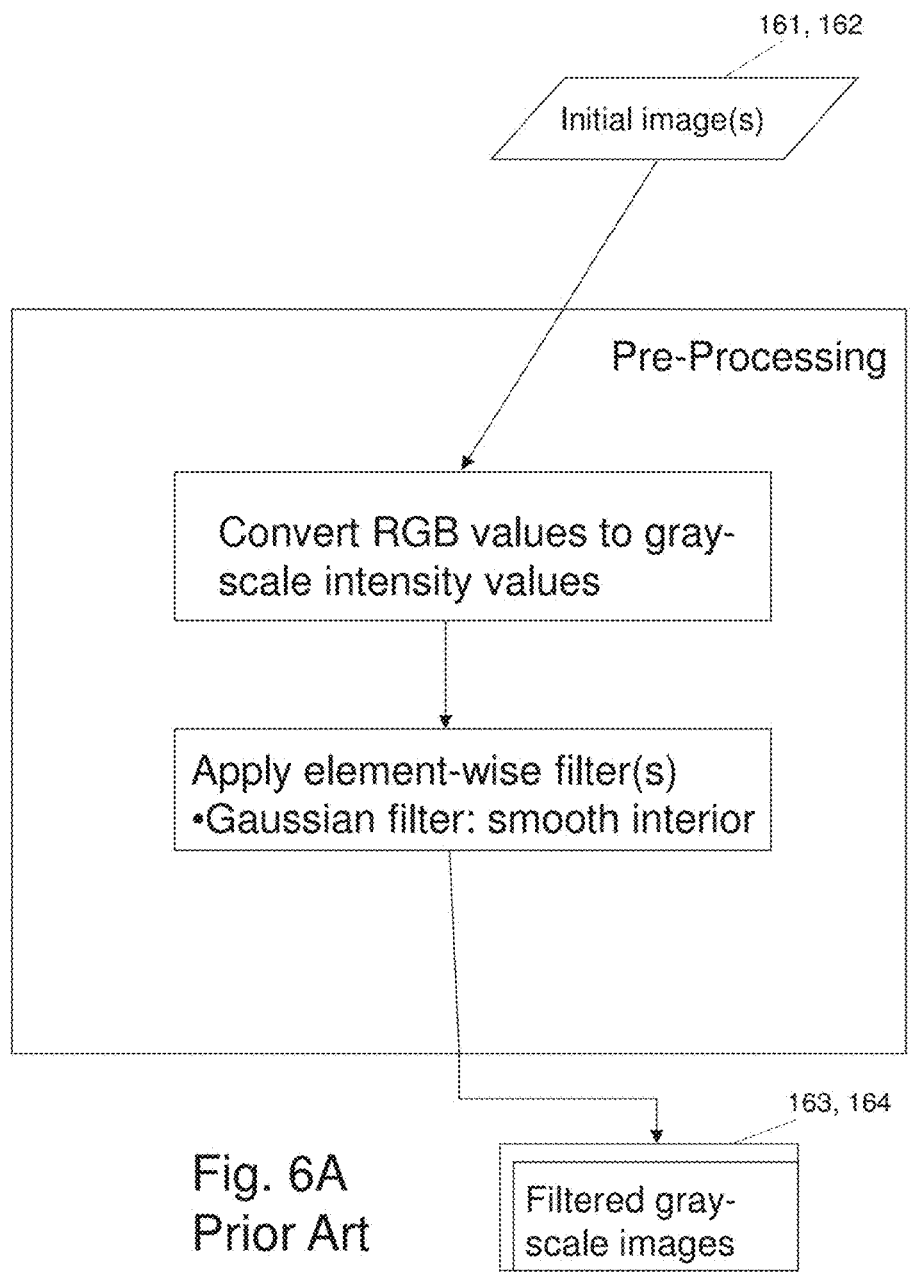
Figure 6B:
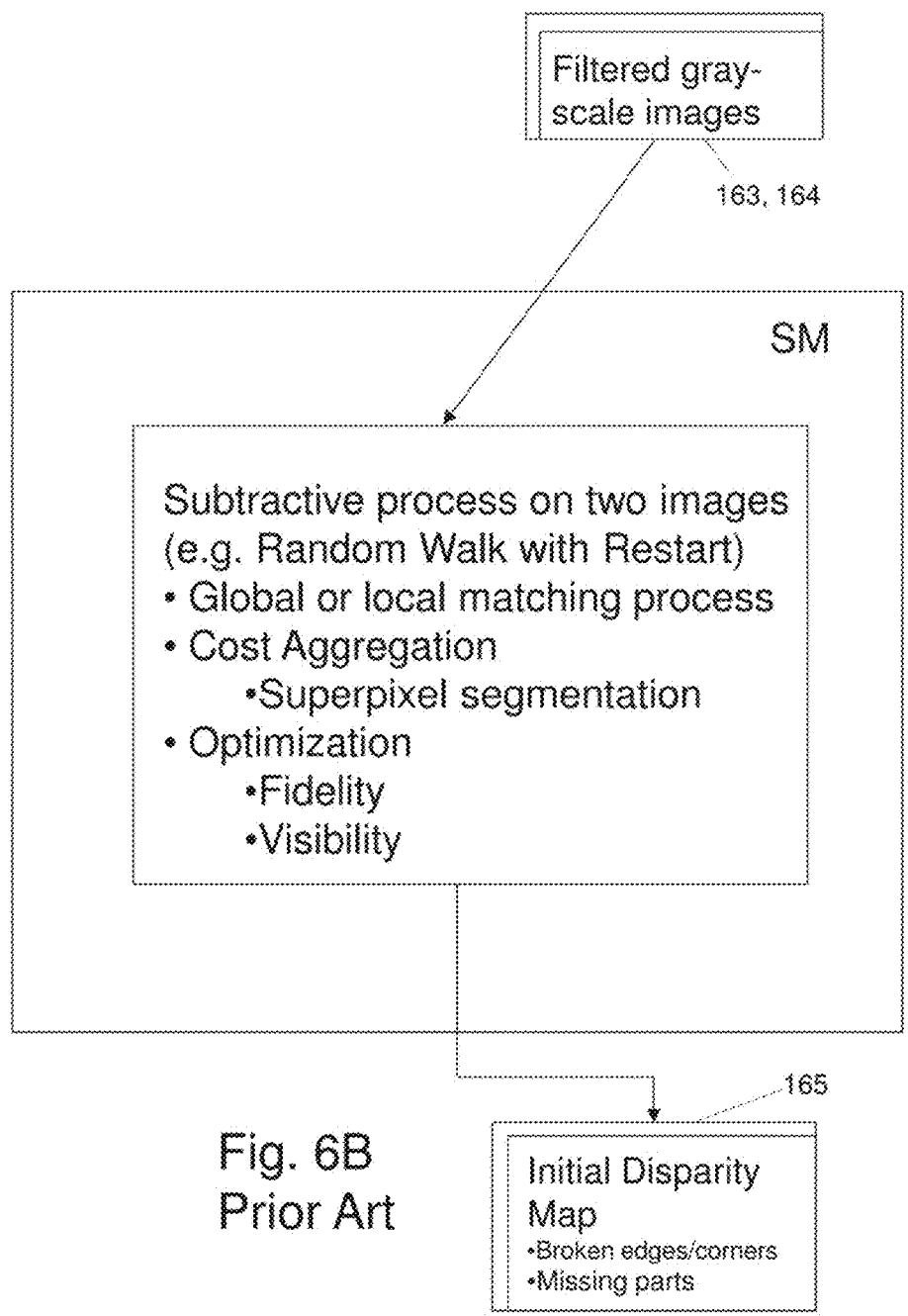
Figure 6C:
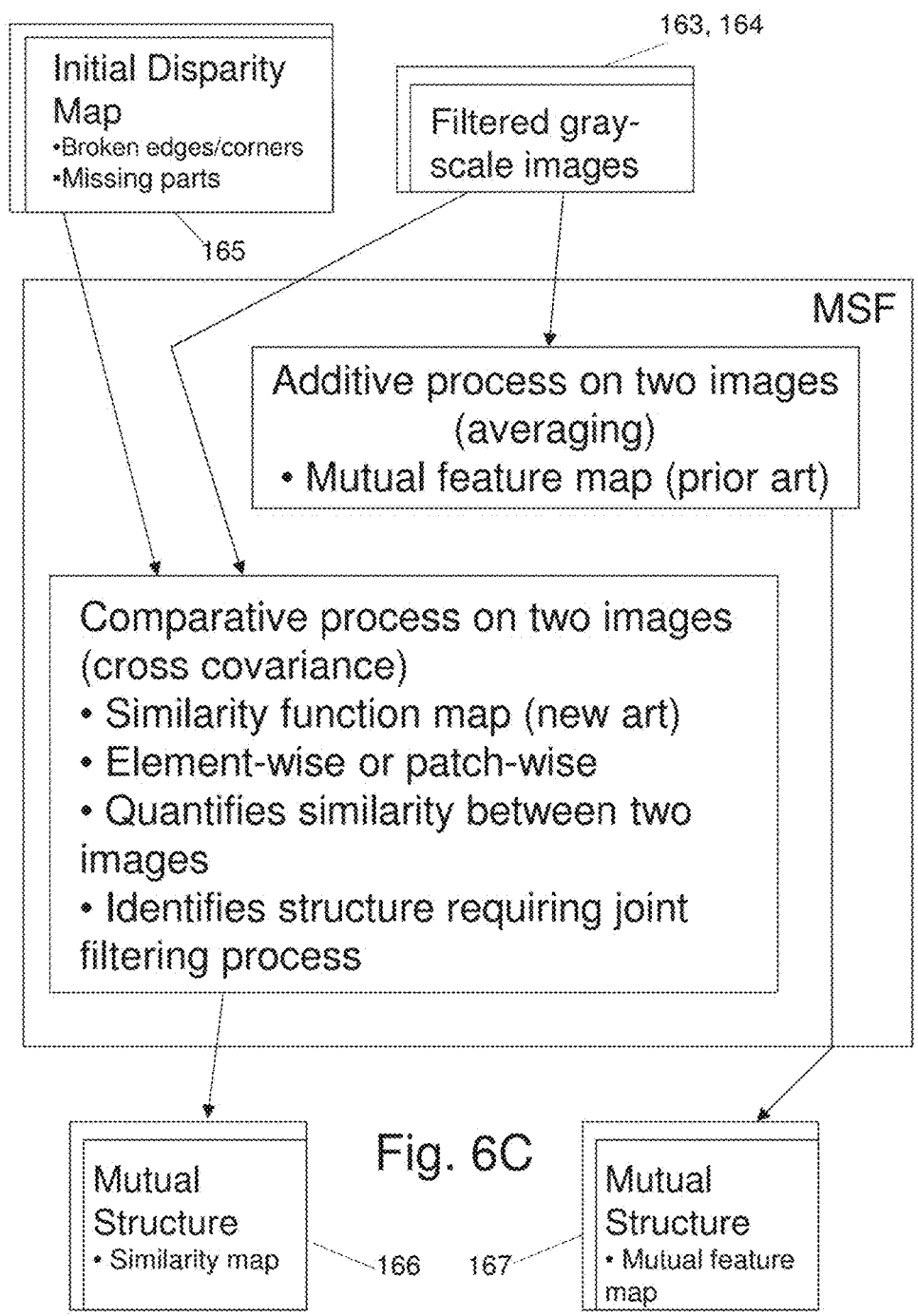
Figure 6F:
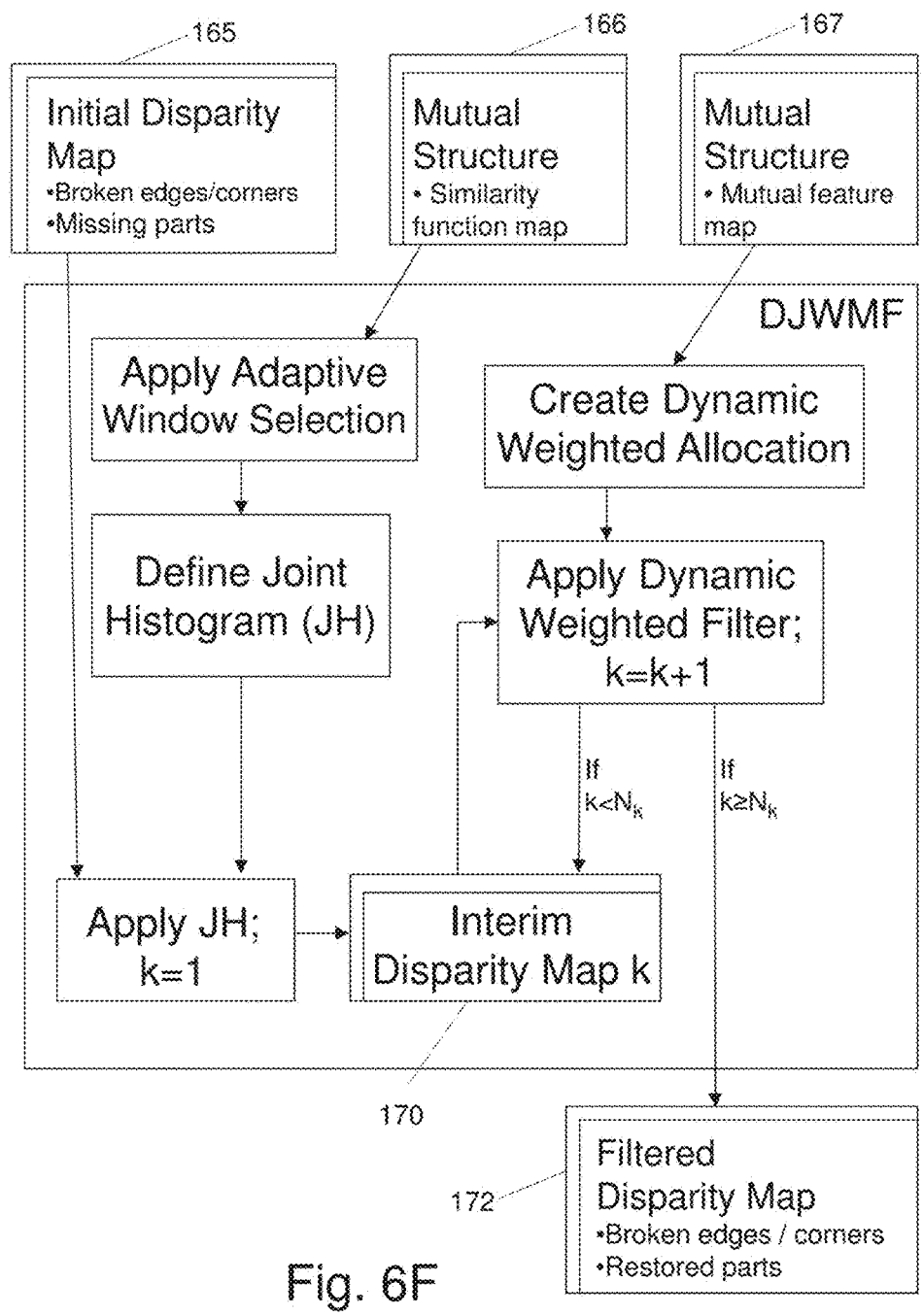
Figure 6G:
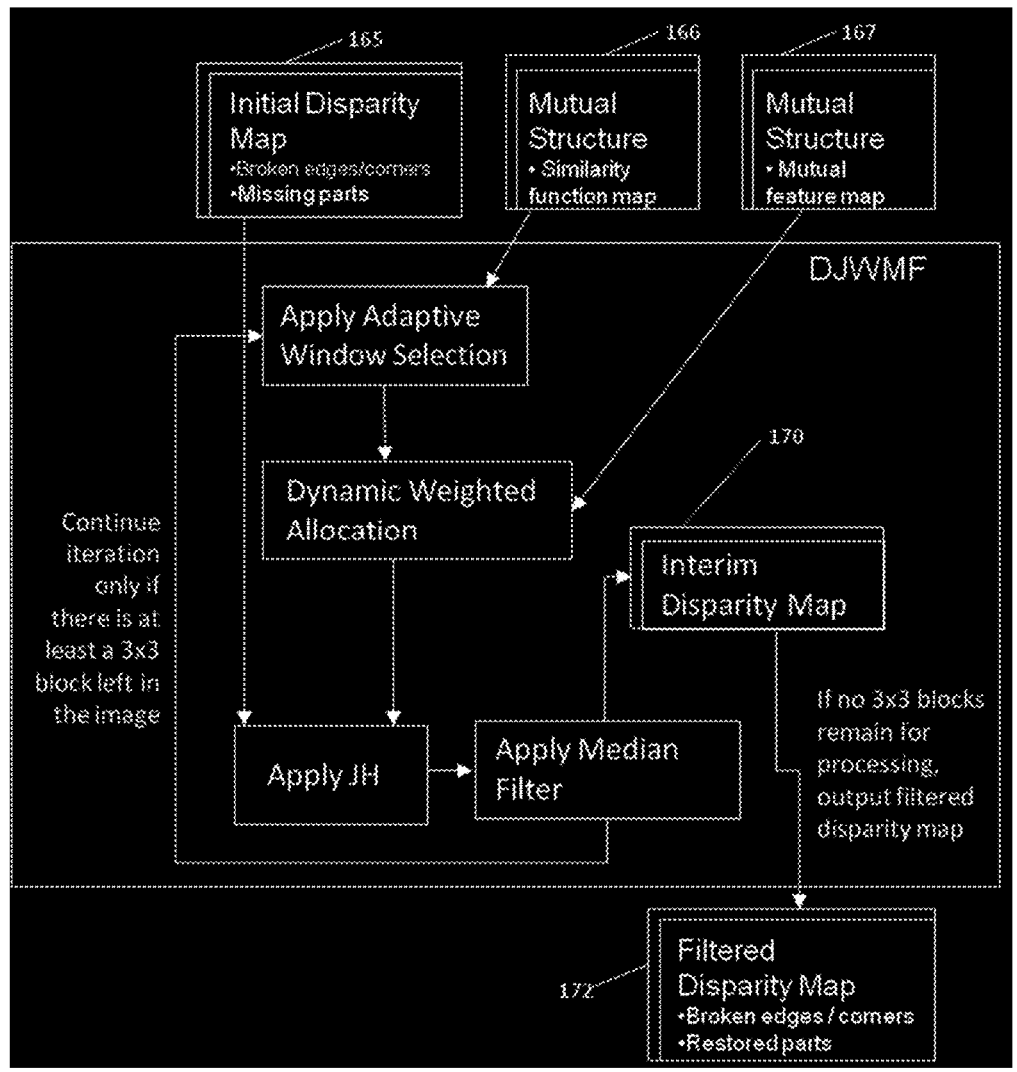
Figure 6H:
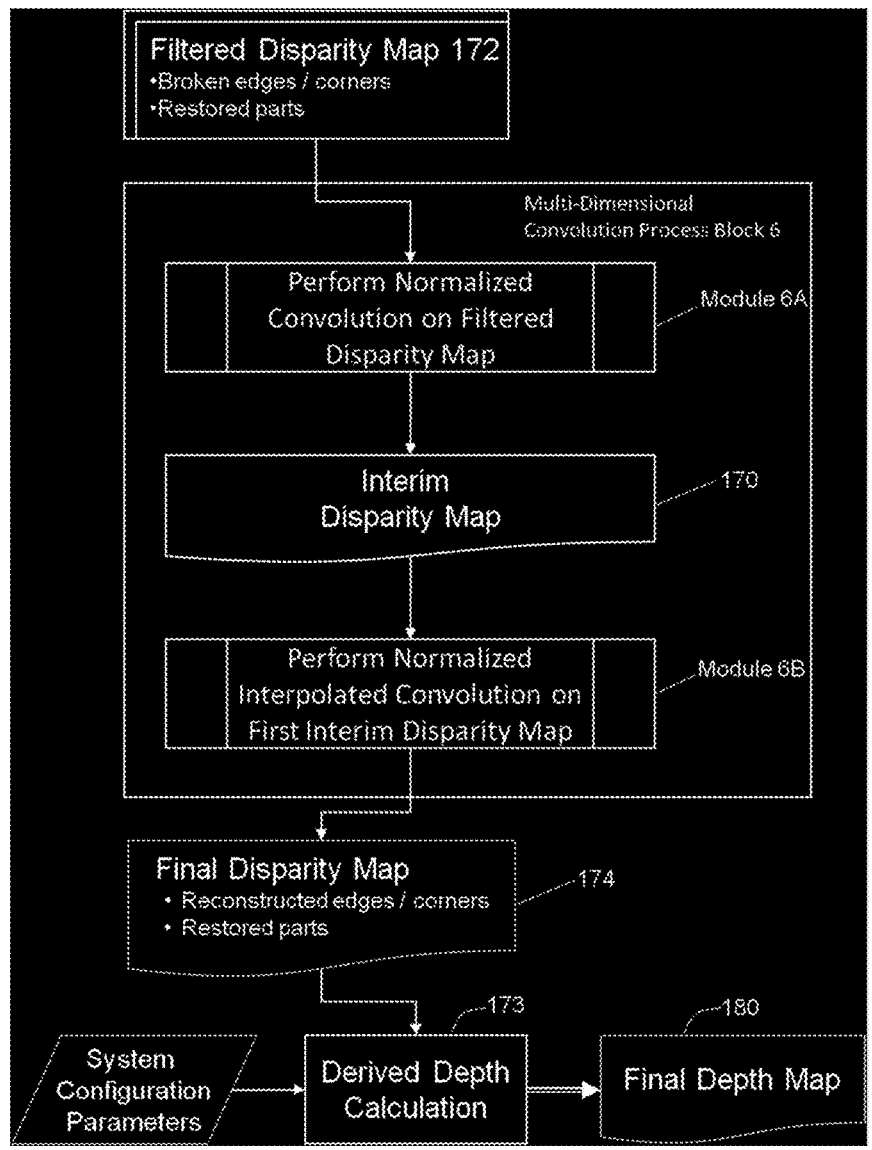
Figure 6I:
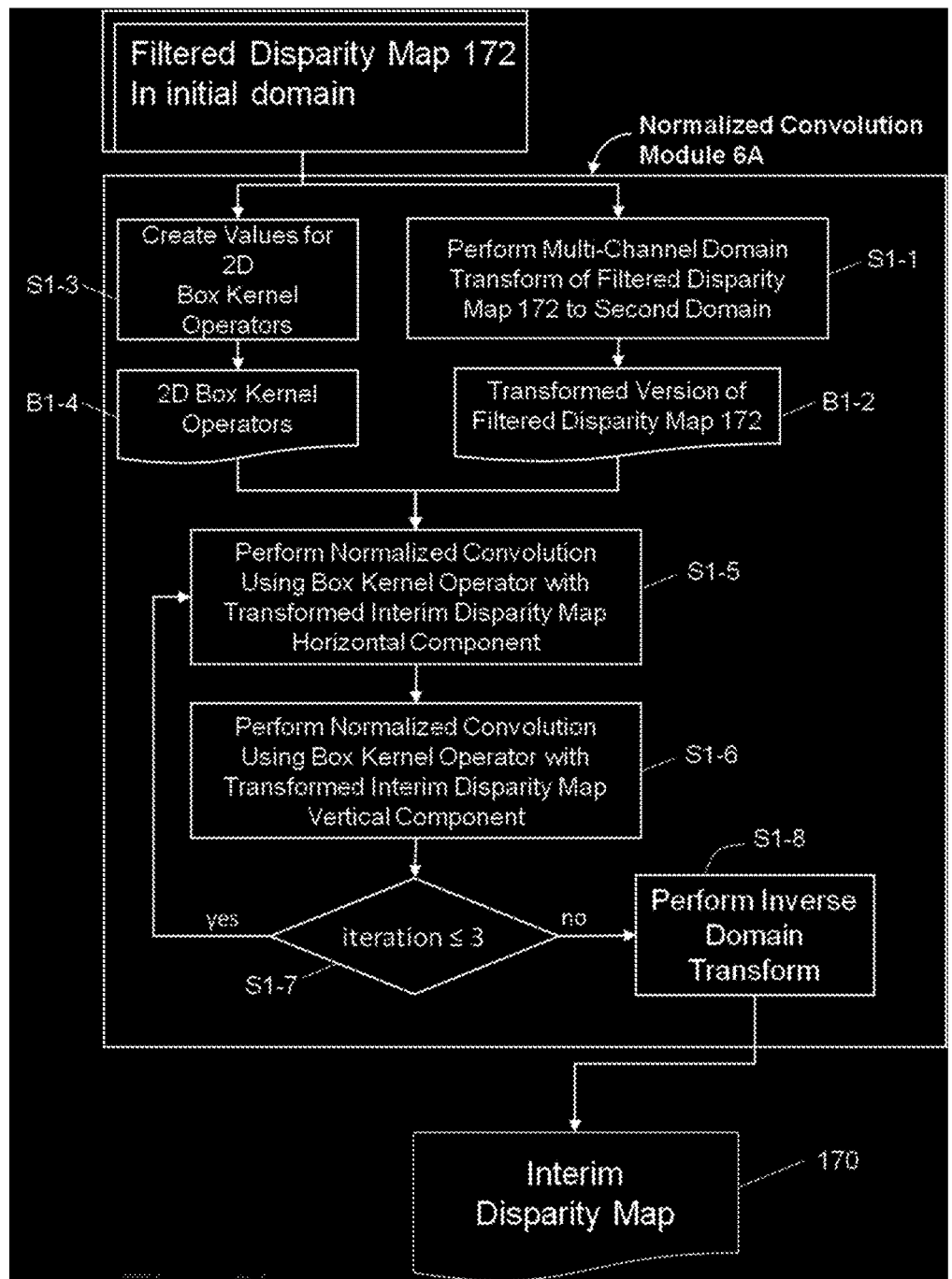
Figure 6J:
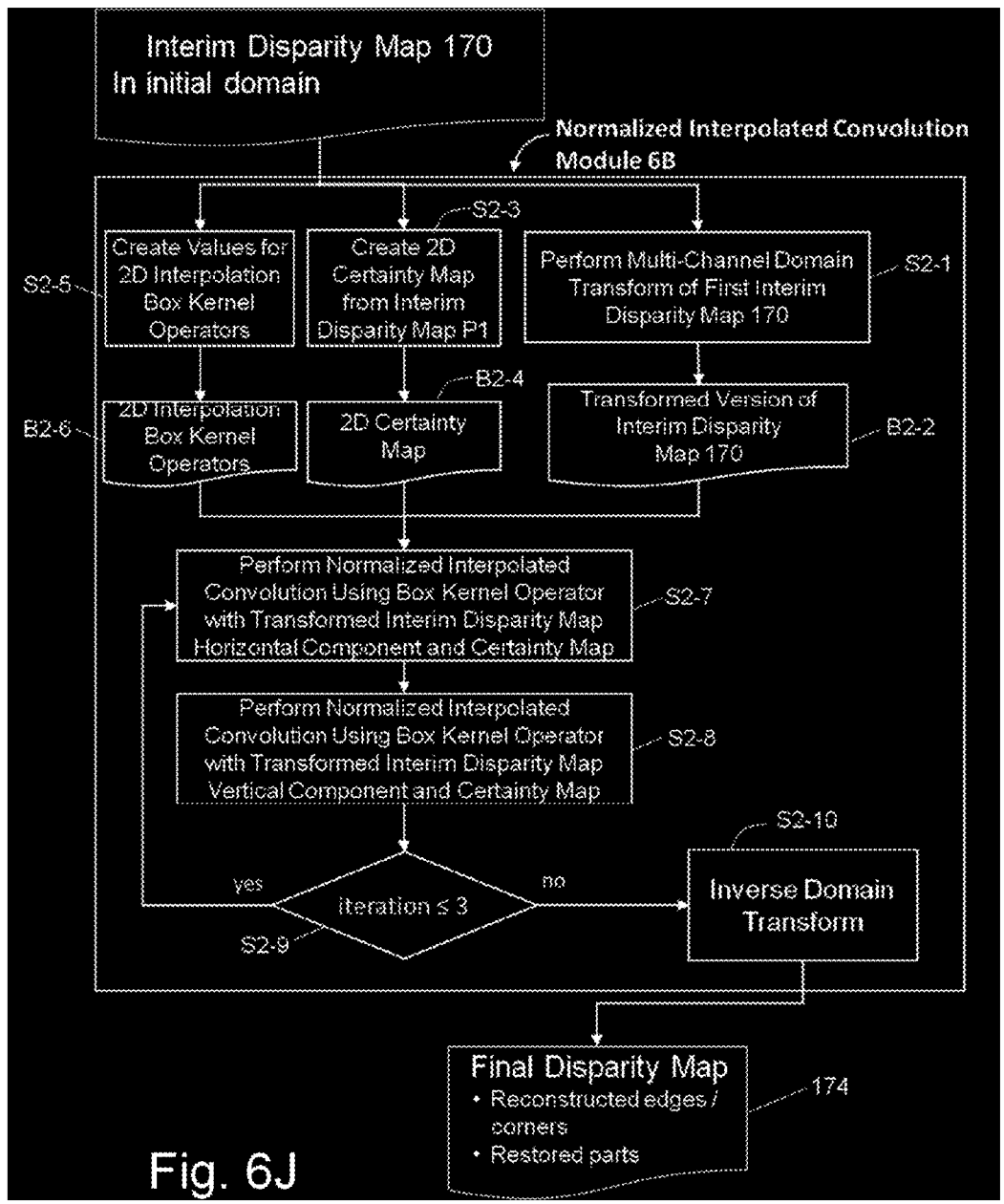
Figure 7A:
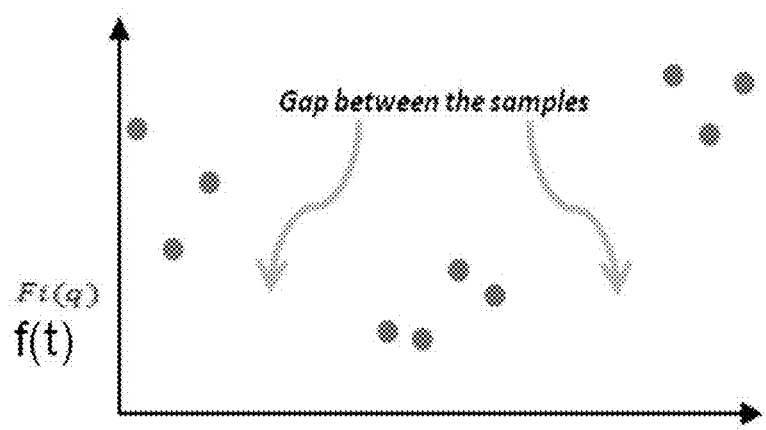
Figure 7B:
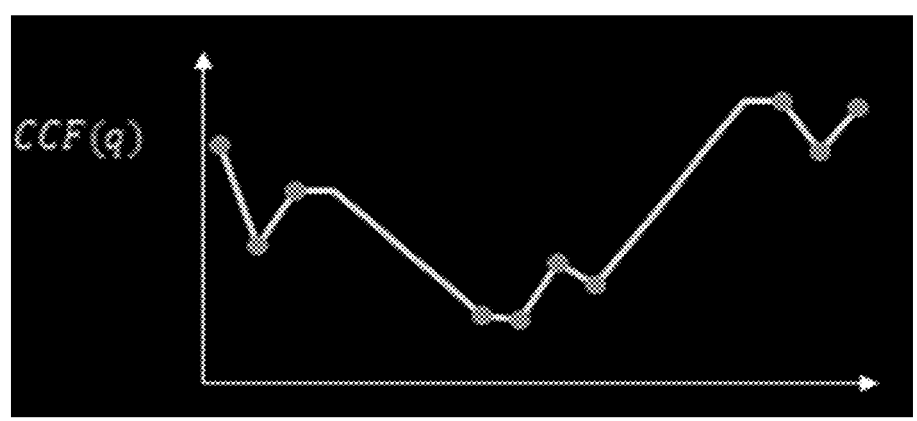
Figure 8:
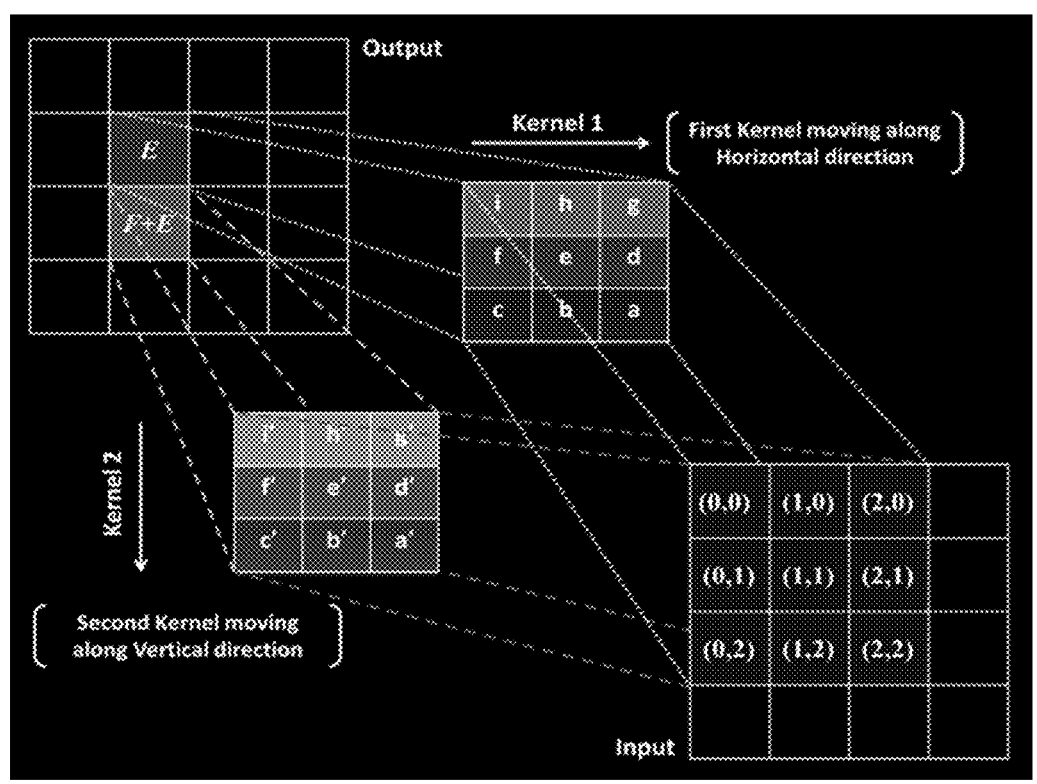
Figure 9:
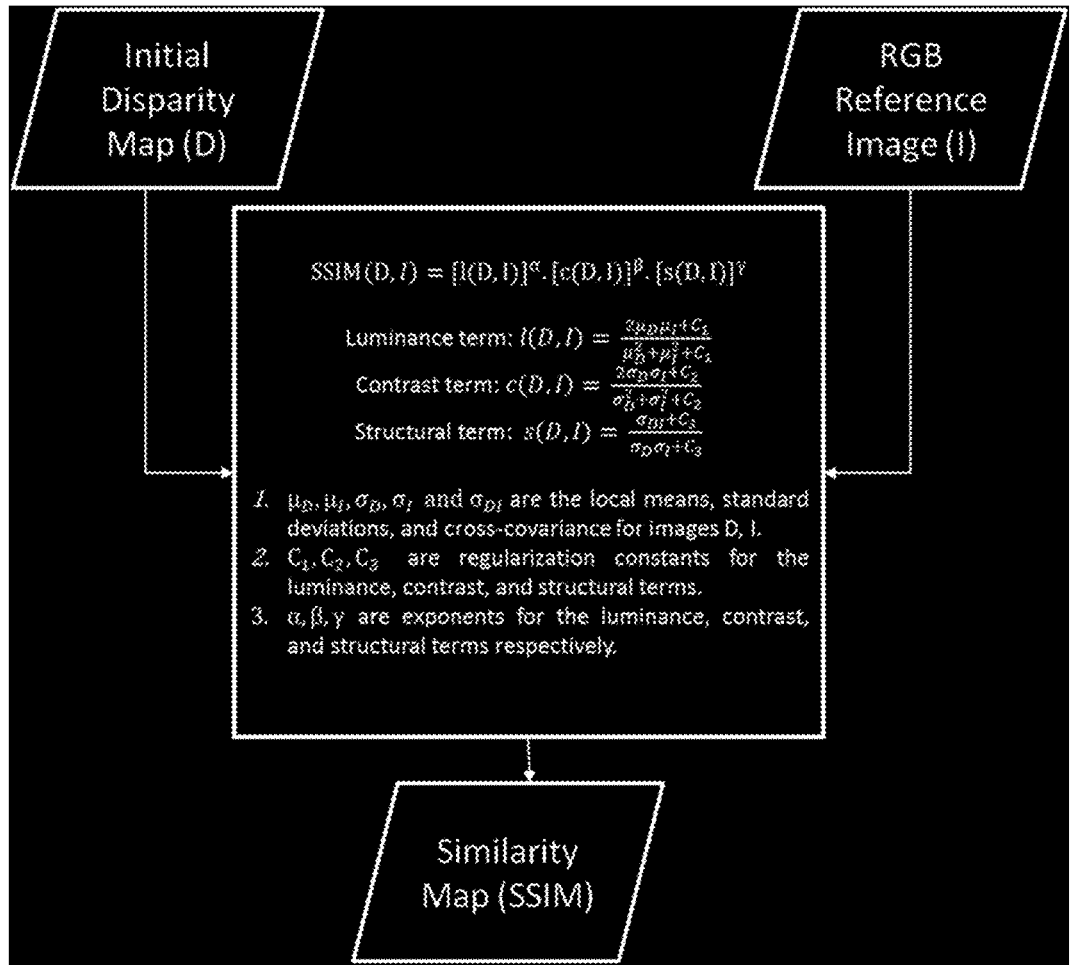
Figure 10:
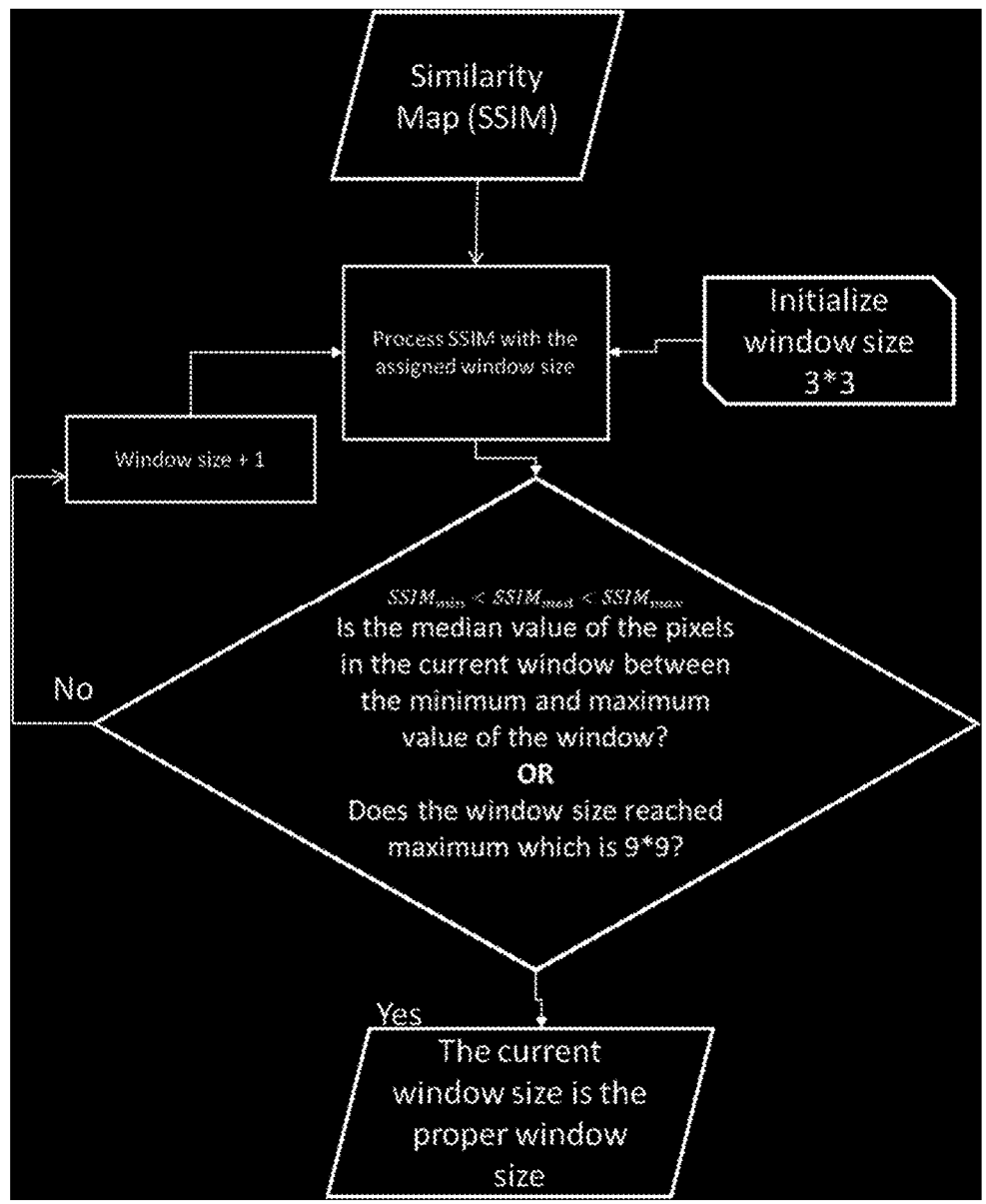
Figure 11:
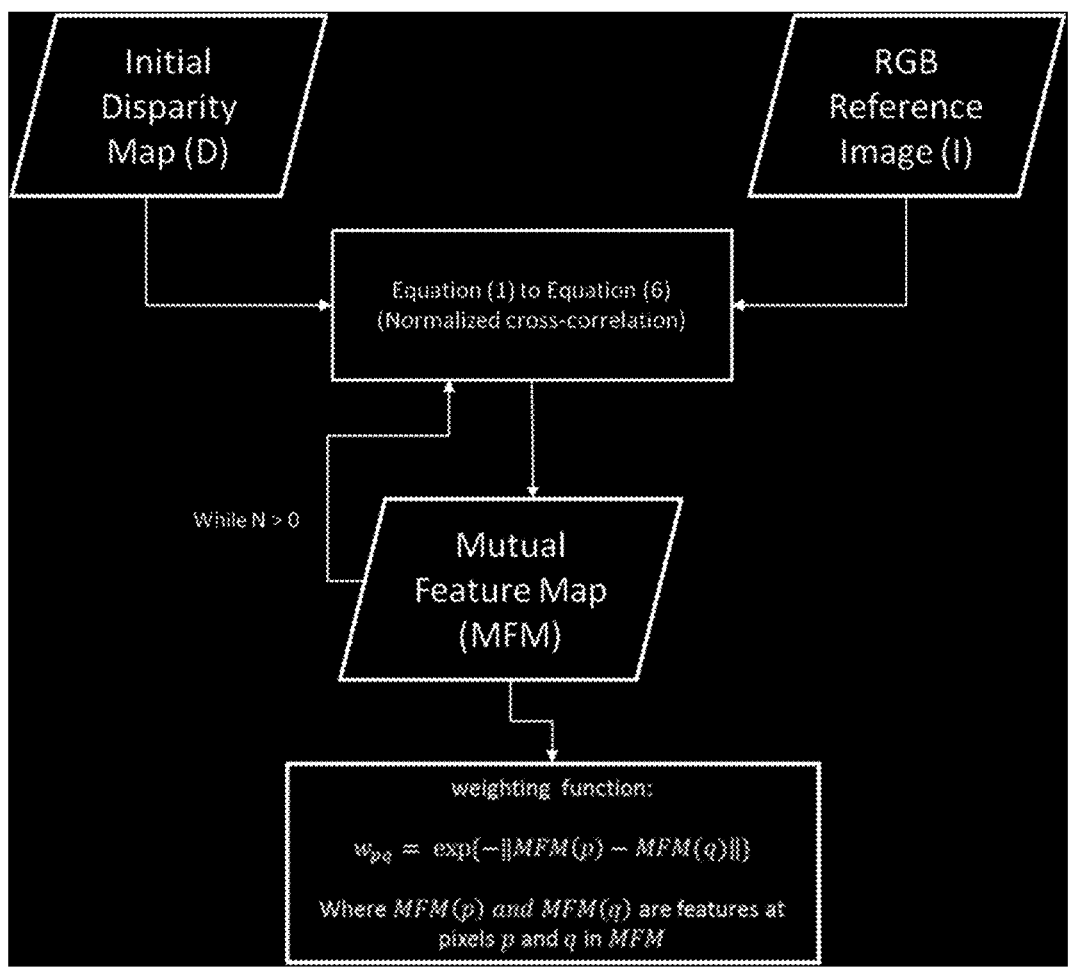
Figure 12:
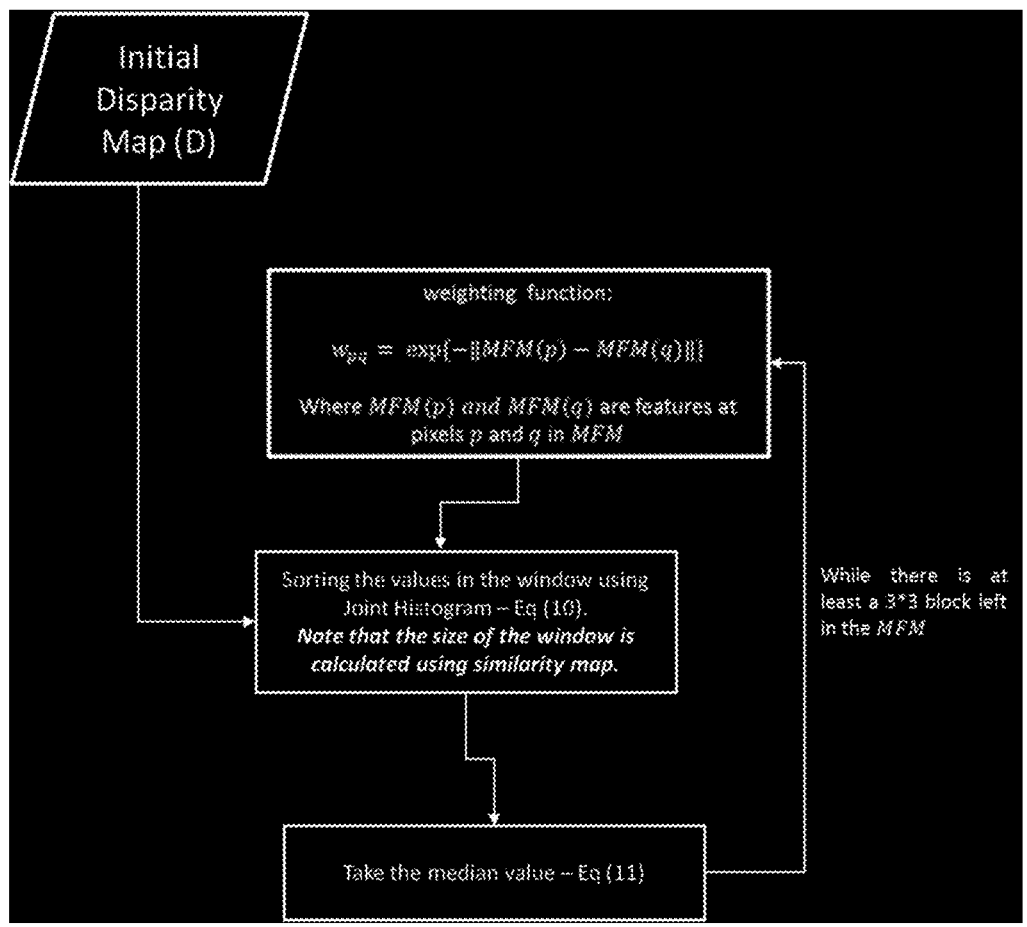
Figure 13:
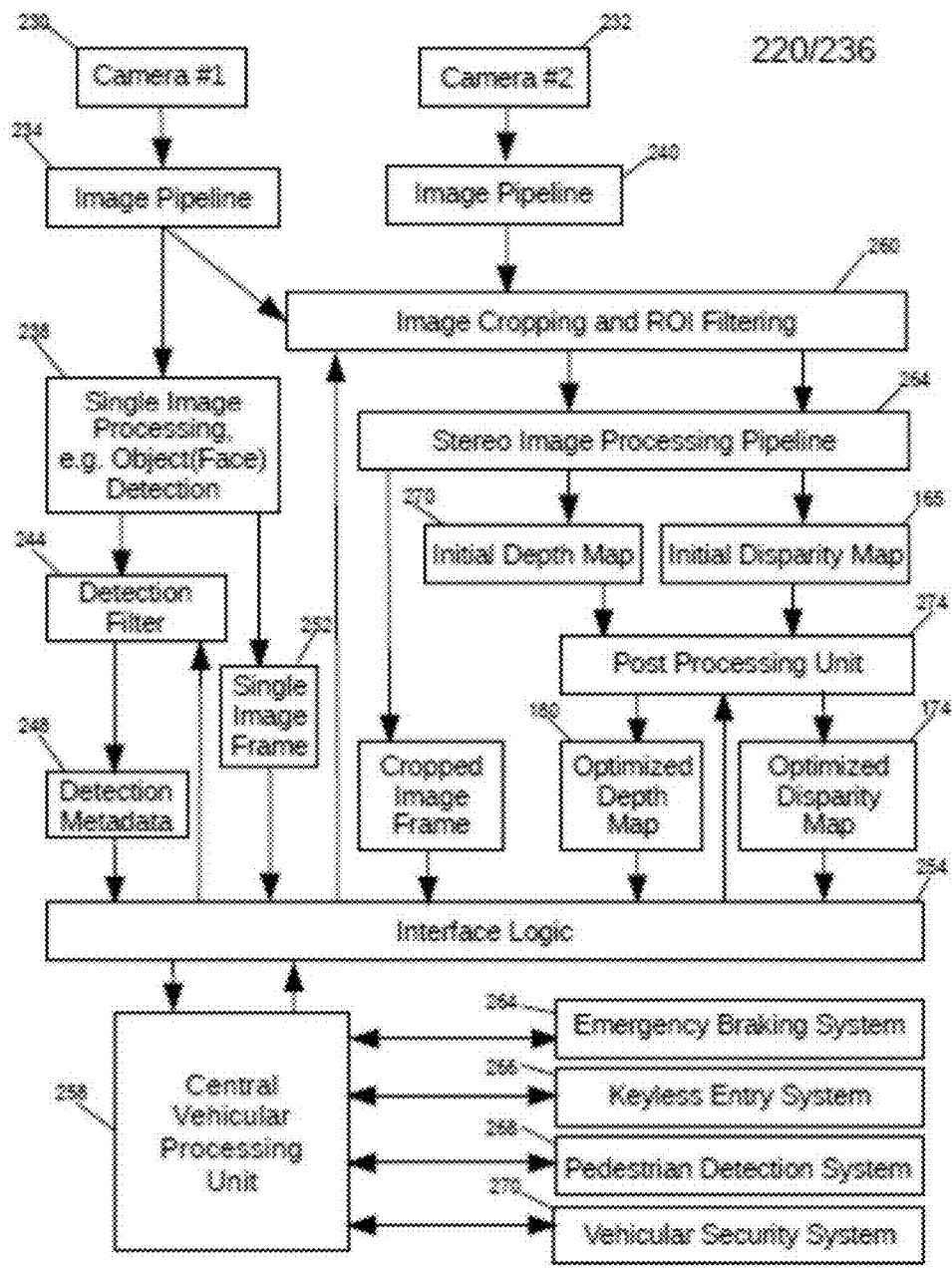

Not shown are color images, first input (initial) (reference) RGB image "I" 161, and second input (initial) (reference) RGB image 162, where RGB input images 161, 162 are a stereo pair;

FIG. 2A shows a first filtered gray-scale image 163;
FIG. 2B shows a second filtered gray-scale image 164;
FIG. 2C shows a Disparity Map After Cost Aggregation 155;
FIG. 2D shows an Initial Disparity Map "D" 165;
FIG. 2E shows a Filtered Disparity Map 172;
FIG. 2F shows a Final Disparity Map 174;
FIG. 2G shows a Disparity Map (After Convolution) 156;
FIG. 2H shows a Disparity Map (After Interpolation) 157;
FIG. 2I shows a Similarity Map 166;
FIG. 2J shows a Mutual Feature Map 167;
FIG. 2K shows a Depth Map 180;
FIG. 2L shows a Labeled Depth Map 181;
In FIG. 3 a series of images illustrates a form of artifact which varies as a function of superpixel size, where FIGS. 3A, 3B, 3C, and 3D respectively illustrate using N=100, 1000, 5000, and 16000 pixels;

FIG. 4 summarizes a series of processing steps in a depth estimation process according to the invention;

FIG. 5 describes a series of information inputs to the processing steps of FIG. 4 to provide a refined depth map, showing Depth Map Refinement Processing 140 according to the invention;

FIGS. 6A and 6B briefly illustrate conventional processing steps incorporated into the exemplary depth estimation process;

FIG. 6C summarizes development of Similarity Map data and Mutual Feature Map data according to the invention;

FIG. 6D shows an exemplary Joint Histogram (JH) 168 in a 3-dimensional (3D) format;

FIG. 6E shows an exemplary Joint Histogram (JH) 168 in a 2-dimensional (2D) format;

FIG. 6F, 6G illustrate alternate embodiments for implementation of a Dynamic Joint Weighted Median Filter Process which applies the map data of FIG. 6C and the Joint Histogram (JH) 168 of FIGS. 6D, 6E to restore, i.e. reconstruct, features in disparity map data;

FIGS. 6H, 6I, 6J illustrate alternate embodiments for implementation of a multistep convolution process performed on disparity map data generated by the filter process of FIG. 6F, 6G to further refine disparity map data for improved depth estimation, by providing details of a Processing Block 6, Normalized Interpolated Convolution (NIC), reference 206;

FIGS. 7A, 7B illustrate details of an interpolation process performed on disparity map data generated by the convolution process of FIGS. 6H, 6I, 6J to further refine disparity map data for improved depth estimation:

FIG. 7A illustrates in 1D exemplary data showing gaps between valid data;

FIG. 7B illustrates in 1D an exemplary reconstruction by interpolation, of missing performed on the data of FIG. 124A;

FIG. 8 illustrates general features of 2D interpolation according to the invention;

FIGS. 9, 10, 11, 12 provide details of a Processing Block 5, Dynamic Joint Weighted Median Filter (DJWMF), reference 205; and FIG. 13 illustrates an exemplary depth estimation system systems design suitable application in a vehicle which incorporates depth map refinement techniques, based on pixel-wise stereo matching which incorporates post processing refinements according to the invention.

Like reference numbers are used throughout the figures to denote like components. Numerous components are illustrated schematically, it being understood that various details, connections and components of an apparent nature are not shown in order to emphasize feature of the invention. Various features shown in the figures are not shown to scale in order to emphasize features of the invention.

DETAILED DESCRIPTION OF THE INVENTION

Before describing in detail particular methods, components and features relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. The following embodiments are not intended to define limits as to the structure or method of the invention, but only to provide exemplary constructions. The embodiments are permissive rather than mandatory and are illustrative rather than exhaustive.

A method and system are described for constructing a depth map. Estimating depths from imagery commonly begins with application of a stereo matching algorithm to construct a disparity map. Stereo correspondence is determined for pixels in a pair of images taken of the same scene from different viewpoints. Depth estimations are based on differences in coordinate positions of the corresponding pixels in the two images. These differences, each referred to as a disparity, are assimilated and processed to form a depth map. Typically, the two images are acquired at the same time with two cameras residing in the same lateral plane, although a depth map may also be determined from correspondence between images of a scene captured at different times, with spatial differences occurring between corresponding pixels in a lateral plane. Generally, for depth estimations, most of the pixels of interest in one image will have a corresponding pixel in the other image. However, the disclosed systems and methods are not limited to embodiments which process data from multiple images.

Stereo matching algorithms are commonly described as local and global. Global methods consider the overall structure of the scene and smooth the image before addressing the cost optimization problem. Global methods address disparity by minimizing a global energy function for all values in the disparity map. Markov random Field modeling uses an iterative framework to ensure smooth disparity maps and high similarity between matching pixels. Generally, global methods are computationally intensive and difficult to apply in small real-time systems.

With local methods the initial matching cost is typically acquired more quickly but less accurately than with global methods. For example, in addition to the presence of noise in the pixel data, relevant portions of the scene may contain areas of relatively smooth texture which render depth determinations in pixel regions of interest unsatisfactory. Advantageously, the pixel-wise depth determinations may be based on computations for each given pixel value as a function of intensity values of other pixels within a window surrounding a given pixel. With local algorithms, the depth value at the pixel P may be based on intensity of grey values or color values. By basing the correspondence determination on the matching cost of pixels in a neighboring region (i.e., a window of pixels surrounding the given pixel P) a more accurate depth value can be determined for the pixel P. For example, with use of a statistical estimation, which only considers information in a local region, noise can be averaged out with little additional computational complexity. The disparity map value assignment may be based on Winner Take All (WTA) optimization. For each pixel, the corresponding disparity value with the minimum cost is assigned to that pixel. The matching cost is aggregated via a sum or an average over the support window.

The accuracy of depth mapping has been dependent on time intensive processing to achieve accurate identification of corresponding pixels. Many time critical machine vision applications require still higher levels of speed and accuracy for depth determinations than previously achievable. There is a need to develop systems and methods which achieve accurate depth information with rapid execution of data intensive, iterative computations.

Embodiments of the invention provide improvements in accuracy of local matching approaches, based on area-wide statistical computations. In one embodiment a processing system 10 applies improved processing techniques in conjunction with a matching algorithm to provide a more accurate disparity map at computation speeds suitable for real time applications. An exemplary stochastic approach comprises a combination of iterative refinements to generate an optimized disparity map.

Figure 1:
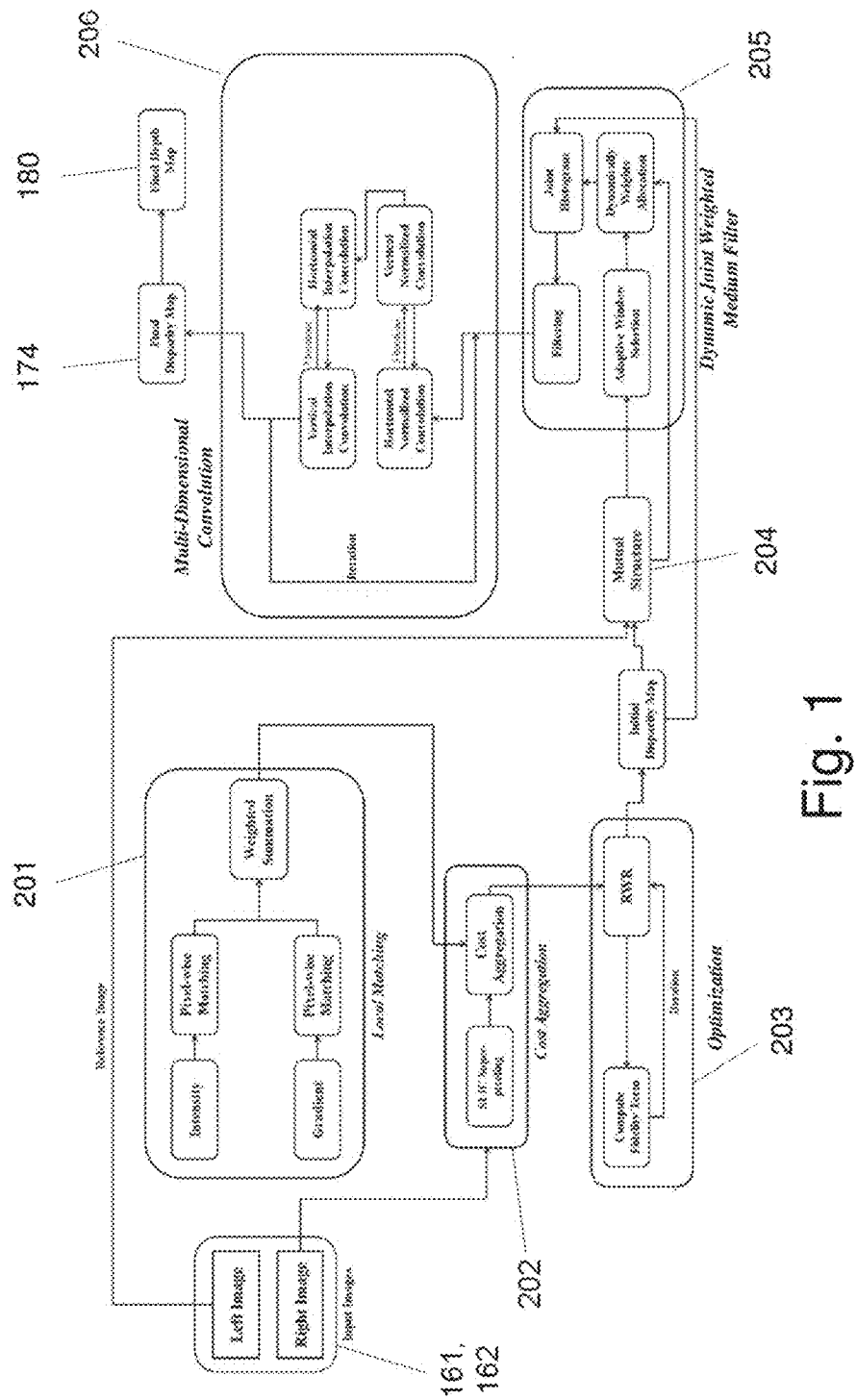
FIG. 1 illustrates, in flowchart format, an exemplary depth estimation system and an exemplary multi-step depth estimation process, based on pixel-wise stereo matching which incorporates post processing refinements according to the invention.

While the invention can be practiced with numerous other matching algorithms, FIG. 1 illustrates application of an Adaptive Random Walk with Restart (ARWR) algorithm in a processing system which generates disparity maps based on pixel wise determination of minimum matching costs, i.e., the matching cost is a measure of how unlikely a disparity is indicative of the actual pixel correspondence. In this example, the ARWR algorithm is iteratively applied to optimize stereo matching. Image registration is enhanced with processing steps that address discontinuities and occlusions, and which apply additional filtering steps. Resulting matching costs bring local matching to improved levels of speed and accuracy.

When performing stereo matching with the system 10, disparity computation is dependent on intensity values within finite windows in first and second reference images of a stereo image pair. The stereo algorithm initially performs pre-processing, followed by a matching cost computation which identifies an initial set of pixel correspondences based on lowest matching costs. This is followed by cost aggregation, disparity computation and a series of disparity refinement steps.

Pre-processing includes initial filtering or other operations applied to one or both images to increase speed and reduce complexity in generating the disparity map. Example operations which eliminate noise and photometric distortions are a conversion of the image data to grayscale values and application of a 3×3 Gaussian smoothing filter.

In one embodiment, the system 10 performs a sequence of six major process steps following pre-processing. The major steps are referred to as Process Blocks 1 through 6. Alternate embodiments of the major steps in the system 10 comprise some of the six Process Blocks or replace Process Blocks with variants, referred to as Alternate Process Blocks.

Local Matching Process Block 1 operates on a stereo image pair comprising first and second images 14, 14', to initially determine pixel-wise correspondence based on the lowest matching cost. Second image 14' is referred to as a reference image in relation to interim and final disparity maps. This is had by comparing portions of captured image structure in the two images based on pixel intensity values and use of a gradient matching technique. Processing within Cost Aggregation Process Block 2 begins with segmenting the images into superpixels based on the local matching. The superpixels become the smallest features for which the matching cost is calculated. For these embodiments, superpixels are defined about depth discontinuities based, for example, on a penalty function, or a requirement to preserve depth boundaries or intensity differences of neighboring superpixels. On this basis, with the superpixels being the smallest features for which the matching cost is calculated, the local correspondence determinations of Block 1 are aggregated to provide an initial disparity map.

In Optimization Process Block 3 the exemplary ARWR matching algorithm is iteratively applied as a matching algorithm to calculate an initial disparity map based on a superpixel-wise cost function. Mutual Structure Process Block 4 generates mutual structure information based on the initial disparity map obtained in Processing Block 3 and a reference image, e.g., one of the reference images 14, 14'. The mutual structure information is modified with weighted filtering in Filter Process Block 5 that provides pixel values in regions of occlusion or depth discontinuity present in the initial disparity map and over-writes the structure of the reference image on the disparity map.

To decrease blocky effects in the disparity map, Multi-Dimensional Convolution (MDC) Process Block 6 applies further filter treatment to the disparity map. Pixel information is converted into a two dimensional signal array on which sequences of convolutions are iteratively performed.

Local matching based on lowest matching cost may be accomplished with a variety of techniques. For the example process illustrated in Block 1, the initial local matching costs are based on a pixel-wise determination of lowest costs. The pixel-wise matching results of a census-based matching operation 22 (also referred to as a census transform operation) are combined with the pixel-wise matching results of a vertical gradient image filter operation 24 and the pixel-wise matching results of a horizontal gradient image filter operation.

The census-based matching operation 22 is typically performed with a non-parametric local transform which maps the intensity values of neighboring pixels located within a predefined window surrounding a central pixel, P, into a bit string to characterize the image structure. For every pixel, P, a binary string, referred to as a census signature, may be calculated by comparing the grey value of the pixel with grey values of neighboring pixels in the window. The Census Transform relies on the relative ordering of local intensity values in each window, and not on the intensity values themselves to map the intensity values of the pixels within the window into the bit string to capture image structure. The center pixel's intensity value is replaced by the bit string composed of a set of values based on Boolean comparisons such that in a square window, moving left to right,

```
If (Current Pixel Intensity < Centre Pixel Intensity):
    Boolean bit=0
        else
    Boolean bit=1
```

The matching cost is computed using the Hamming distance of two binary vectors.

Summarily, when the value of a neighboring pixel $P_{i,j}$ is less than the value of the central pixel, the corresponding value mapped into the binary string is set to zero; and when the value of a neighboring pixel $P_{i,j}$ is greater than the value of the central pixel, the corresponding value mapped into the binary string is set to one. The census transformation performs well, even when the image structure contains radiometric variations due to specular reflections.

However, the census-based matching can introduce errors, particularly in areas of a scene having repetitive or similar texture patterns. One source of error with stereo correspondence methods is that smoothness assumptions are not valid in depth discontinuity regions, e.g., when the areas contain edges indicative of depth variations. Where disparity values between the foreground and background structure vary, the depth boundaries are difficult to resolve and appear blurred due to perceived smoothness. The absence of texture is not necessarily a reliable indicator of an absence of depth.

Because image intensity values are not always indicative of changes in depth, pixel intensity values encoded in census transform bit strings can contribute to errors in pixel matching. To overcome this problem, gradient image matching is applied with, for example, vertical and horizontal 3×3 or 5×5

Sobel filters, also referred to as Sobel-Feldman operators. The operators yield gradient magnitudes which emphasize regions of high spatial frequency to facilitate edge detection and more accurate correspondence. Noting that similarity criteria in stereo matching primarily apply to Lambertian surfaces, another advantage of employing gradient image matching is that matching costs estimated with the processing according to Block 1 are less sensitive to the spatial variability of specular reflections and are, therefore, less viewpoint dependent when traditional stereo correspondence methods are unable to accurately calculate disparity values.

Because the horizontal and vertical gradient image filter operations 24 and 26 indicate directional change in the intensity or color in an image, the resulting gradient images may be used to extract edge information from the images. Gradient images are created from an original image 14 or 14' by convolving with a filter, such as the Sobel filter. Each pixel of the gradient image 24 or 26 measures the change in intensity of that same point in the original image in a given direction to provide the full range of change in both dimensions. Pixels with relatively large gradient values are candidate edge pixels, and the pixels with the largest gradient values in the direction of the gradient may be deemed edge pixels. Gradient image data is also useful for robust feature and texture matching.

In one example, the Sobel operator uses two 3×3 kernels which are convolved with the original image to calculate approximations of the derivatives—one for horizontal changes, and one for vertical. Referring to the image to be operated on (e.g., image 14 or 14') as I, we calculate two derivatives indicative of horizontal and vertical rates of change in image intensity, each with a square kernel of odd size.

The horizontal image gradient values are computed by convolving I with a kernel $G_x$. For a kernel size of 3, $G_x$ would be computed as:

$$G_x = \begin{bmatrix} -1 & 0 & +1 \\ -2 & 0 & +2 \\ -1 & 0 & +1 \end{bmatrix} * I \quad (1)$$

The horizontal image gradient values are computed by convolving I with a kernel $G_y$. For a kernel size of 3, $G_y$ would be computed as:

$$G_y = \begin{bmatrix} -1 & -2 & -1 \\ 0 & 0 & 0 \\ +1 & +2 & +1 \end{bmatrix} * I \quad (2)$$

At each point of the image we calculate an approximation of the gradient magnitude, G, at that point by combining $G_x$ and $G_y$:

$$G = \sqrt{G_x^2 + G_y^2} \quad (3)$$

The combination of census transform matching 22 and gradient image matching 24, 26 renders the local matching method more robust on non-Lambertian surfaces. The calculated census transform values and vertical and horizontal gradient values of G are combined with a weighting factor to create a pixel-wise combined matching cost CMC. The weighting factors are selected to balance the influence of the census and gradient components. The result is then truncated to limit influence of outliers. Summarily, the gradient image matching reveals structure such as edges and corners of high spatial frequency to facilitate edge detection and more accurate correspondence.

Local matching costs are obtainable with other component operations, including the rank transform, normalized cross-correlation, absolute intensity difference, squared intensity difference, and mutual information. In one series of variants of Processing Block 1 initial matching costs are calculated for each pixel, P, with an additive combination of the component operations. For embodiments which iteratively apply an ARWR matching algorithm, the initial matching cost is calculated pixel-wise by employing methods most suitable to accurate local matching as a precursor to deriving the disparity map with, for example, superpixel segmentation.

Optimizing local matching in Process Block 1 is limited as it is based on a combination of operations which are applied as a weighted sum. That is, neither combination can fully influence the result, and inclusion of additional operations further limits the influence of all operations. The weighted combination of the census transformation and the gradient image filter operations provide improved performance for an image structure that contains both radiometric variations due to specular reflections and edge regions that require detection with a gradient filter operation. However, similarity criteria used in stereo matching are only strictly valid for surfaces exhibiting Lambertian reflectance characteristics. Specular reflections, being viewpoint dependent, can cause large intensity differences in values between corresponding pixels. In the presence of specular reflection, traditional stereo methods are, at times, unable to establish correspondence with acceptable accuracy. Further improvements in correspondence determinations are attained with refinements to or addition of other process steps.

The aggregation step applies pixel matching costs over a region to reduce correspondence errors and improve the overall accuracy of the stereo matching. Improvements in accuracy and speed are highly dependent on the operations incorporated in the cost aggregation step.

For example, prior to accumulating matching costs the cost aggregation process may replace the cost of assigning disparity d to a given pixel, P, with the average cost of assigning d to all pixels in a square window centered at the pixel P. This simplistic square-window approach implicitly assumes that all pixels in the square window have disparity values similar to that of the center pixel. The aggregated cost for the pixel, P, may be calculated as a sum of the costs in a 3×3 square window centered about that pixel. Processing with the square-window approach for cost aggregation is time intensive. Although it is based on assigning an average cost to each pixel, the approach may aggregate matching costs among all pixels.

However, it is well known that when groups of adjoining pixels are clustered into super-pixels, and intensity values of super-pixels are synthesized from the constituent pixel-wise data, cost aggregation based on the super-pixels becomes more robust to variations caused by artifact—including variations due to specular reflections. With the super-pixels becoming the smallest parts of an image to be matched, determining cost aggregation with the super-pixel values is an advantageous extension over pixel-wise aggregation of matched data. Being statistically based, intensity values of adjoining super-pixels do not exhibit undesirable variations to the same extent as individual pixel values of adjoining pixels. Use of super-pixels also results in reduced memory requirements in the remainder of the processing blocks of the system 10. To this end, Cost Aggregation Process Block 2 employs a Simple Linear Iterative Clustering (SLIC) algorithm to define super-pixels. An exemplary super-pixel wise cost function is the mean of all cost values of the pixels inside the super-pixel S:

$$F_r(S, d) = \frac{1}{n_s} \sum_{(u,v) \in S} P_r(u, v, d) \quad (4)$$

where: $F_r$ is the cost of the super-pixel S, $n_s$ is the number of pixels in the super-pixel S, d is the disparity between corresponding pixels and $P_r(u,v,d)$ is the pixel-wise matching cost calculated by the census transform and image gradient matching operations.

Disparity values are heavily influenced by the manner in which cost aggregation process is performed. Cost aggregation based on super-pixeling provides improved matching costs over larger areas. Yet, even with economies resulting from use of the SLIC algorithm to define super-pixels, the processing requirements for cost aggregation in Process Block 2 are time intensive (e.g., image-matching costs must be combined to obtain a more reliable estimate of matching costs over an image region). The necessary high speed computation and memory bandwidth presents an impediment to deploying stereo matching in real-time applications, including automated braking systems, steering of self-driving cars and 3-D scene reconstruction. With the demand for greater accuracy and speed in disparity maps generated at video frame rates, design of an improved cost aggregation methodology is seen as a critically important element to improving the overall performance of the matching algorithm.

In the past, processing requirements have been based, in part, on requirements that superpixels be defined with a density which avoids artifact that degrades depth map accuracy. A feature of the invention is based on recognition that cost aggregation may be performed with less regard to limiting the sizes of superpixels, in order to increase computational speed, but without degradation in depth map accuracy.

A. Disparity Map Optimization with an Adaptive Algorithm Block 3

In the Optimization Process Block 3 of the system 10, the ARWR algorithm, illustrated as an exemplary matching algorithm, is iteratively applied to calculate an initial disparity map, 165, based on a superpixel-wise cost function, where superpixel segmentation is determined in Cost Aggregation Processing Block 2 with, for example, the SLIC algorithm or the LRW algorithm. Iterative updating of Processing Block 3 continues until convergence occurs in order to achieve optimum disparity with respect to regions of occlusion and discontinuity. The ARWR algorithm updates the matching cost adaptively by accounting for positions of super-pixels in the regions of occlusion and depth discontinuity. To recover smoothness failures in these regions the ARWR algorithm may, optionally, incorporate a visibility constraint or a data fidelity term.

The visibility constraint accounts for the absence of pixel correspondence in occlusion regions. The iterative process may include a visibility term in the form of a multiplier, M, which requires that an occluded pixel (e.g., superpixel) not be associated with a matching pixel on the reference image 14, and a non-occluded superpixel have at least one candidate matching pixel on the reference image 14. See S. Lee, et al., "Robust Stereo Matching Using Adaptive Random Walk with Restart Algorithm," *Image and Vision Computing*, vol. 37, pp 1-11 (2015).

The multiplier, M, is zero when a pixel is occluded to reflect that there is no matching pixel in the disparity image; and allows for non-occluded pixels to each have at least one match. That is, for super-pixels having positions in regions containing an occlusion or a depth discontinuity, the cost function is adaptively updated with an iterative application of the algorithm until there is convergence of matching costs. The occluded regions may, for example, be detected by performing consistency checks between images. If the disparity value is not consistent between a reference image and a target image, a superpixel is determined to be occluded. After superpixels are iteratively validated as non-occlusive, the results are mapped into a validation vector and the matching costs are multiplied by the validation vector. See S. Lee, et al, p. 5.

In regions where disparity values vary, smoothness assumptions can blur boundaries between foreground and background depths, especially when variations in disparity values are substantial. Intensity differences between super-pixels along depth boundaries are preserved by reducing the smoothness constraint in regions of depth discontinuity. It has been proposed to do so by modifying the standard Random Walk with Restart (RWR) iterative algorithm with a data fidelity term, $\Psi$, based on a threshold change in the disparity value. See S. Lee, et al, p. 6. This allows preservation of the depth discontinuity. By so preserving the depth discontinuity, a more accurate or optimal disparity value is identified for each superpixel based on a refined calculation of the updated matching cost. The data fidelity term measures the degree of similarity between two pixels (or regions) in terms of intensity. It preserves depth boundaries and is effective at the boundaries of objects where there is a unique match or there are relatively few likely matches.

The Random Walk with Restart (RWR) method for correspondence matching is based on determining matching costs between pixels (i.e., the probability that points in different images are in true correspondence). The random walker iteratively transmits from an initial node to another node in its neighborhood with the probability that is proportional to the edge weight between them. Also at each step, it has a restarting probability c to return to the initial node. $\vec{r}_i$, the relevance score of node j with respect to node i, is based on a random particle iteratively transmitted from node i to its neighborhood with the probability proportional to the edge weights $\tilde{W}$:

$$\vec{r}_i = c\tilde{W}\vec{r}_i + (1-c)\vec{e}_i \quad (10)(5)$$

At each step, there is a probability c of a return to the node i. The relevance score of node j with respect to the node i is defined as the steady-state probability $r_{i,j}$ that the walker will finally stay at node j. The iteratively updated matching cost, $X_{t+1}^d$, is given as:

$$X_{t+1}^d = c\overline{W}X_t^d + (1-c)X_0^d \quad (11)(6)$$

where $X_0^d = [F(s,d)]_{k \times 1}$ represents the initial matching cost, $X_t^d$ denotes the updated matching cost, t is the number of iterations, k is the number of super-pixels and (1–c) is the restart probability. F(s,d) is the super-pixel wise cost function with $F_r(S,d)$ being the mean of all cost values of the pixels inside a super-pixel S. $\overline{W} = [w_{ij}]_{k \times k}$, which is the weighted matrix, comprises the edge weights $w_{ij}$, which are influenced by the intensity similarity between neighboring super-pixels.

$$w_{ij} = \exp\left(-\frac{(I(s_i) - I(s_j))^2}{\sigma_e}\right) \quad (12)(7)$$

where $l(s_i)$ and $l(s_j)$ are the intensities of the i-th and j-th super-pixels and $\sigma_e$ is a parameter that controls the shape of the function. The intensity of super-pixels is computed by averaging the intensity of the corresponding pixels.

Equation (6) is iterated until convergence, which is influenced by updating of the weights $w_{ij}$. Convergence is reached when the $L_2$ norm of successive estimates of $X_{t+1}{}^d$ is below a threshold $\xi$, or when a maximum iteration step m is reached. The $L_2$ norm of a vector is the square root of the sum of the absolute values squared.

Optimization Process Block 3 may incorporates a fidelity term, $\Psi_t{}^d$, and a visibility term, $V_t{}^d$, into the matching cost, $X_{t+1}{}^d$. See Equation (8) which weights the fidelity term, $\Psi_t{}^d$, and the visibility term, $V_t{}^d$, with respect to one another with a factor $\lambda$:

$$X_{t+1}{}^d = c\overline{W}((1-\lambda)V_t{}^d + \lambda\Psi_t{}^d) + (1-c)X_0{}^d \quad (13)(8)$$

Based on Equation (8), the final disparity map is computed by combining the super-pixel and pixel-wise matching costs:

$$\hat{d} = \arg_d\min(X_t{}^d(s) + \gamma P(u,v,d)) \quad (14)(9)$$

where s is the super-pixel corresponding to the pixel (u,v) and $\gamma$ represents the weighting of the super-pixels and pixel-wise matching cost. In another embodiment the visibility term is not included in the cost function, resulting in $$X_{t+1}{}^d = c\overline{W}(\lambda\Psi_t{}^d) + (1-c)X_0{}^d \quad (15)(10)$$

The interim disparity map, $165_i$, generated by Optimization Processing Block 3 may be given as the combination of superpixel and pixel wise matching costs similar to the prior art approach taken to construct a final disparity map. See S. Lee, et al, p. 6. Summarily, an embodiment of an algorithm for developing the interim disparity map includes the following sequence of steps:
1. Computing the local matching cost for each pixel using the truncated weighted sum of the census transform and gradient image matching.
2. Aggregating the matching costs inside each superpixel.
3. Computing the optional visibility term based on the current matching cost.
4. Computing the fidelity term using the robust penalty function.
5. Updating the matching costs.
6. Iterating Steps 3, 4 and 5 multiple times to determine the final disparity from the minimum cost.

A first post processing stage of the system 10 generates an interim disparity map using mutual structure information (166, 167) in a DJW Median Filter operation performed on the initial disparity map 165 and the first reference RGB image 161. The combination of Processing Blocks 4 and 5 transfer structural information from the reference image 161 to the disparity map 165, in essence guiding the filter to restore edges in the depth map. Registration between two images of the same scene is optimized based on sequential alignment between each array of pixel data. A final disparity map 174 is then developed in a second processing stage by an iterative sequence of vertical and horizontal interpolated convolutions. See Processing Block 6.

Two forms of a mutual structure calculation are used as input information to the Dynamic Joint Weighted Median Filter (DJWMF) operation 205 of Process Block 5:

(1) A Similarity Map (SM) 166 provides a measure of similarity between the initial disparity map 165 and the first RGB reference image 161. FIG. 6C illustrates creation of SM 166. FIG. 6F illustrates an exemplary application of SM 166 to determine values of an adjustable window size during the DJWMF operation 205 on the Initial Disparity Map 165.

(2) Mutual Feature Map (MFM) 167 is the result of an additive mutual structure calculation from which a Dynamic Weighted Allocation is created for application in the filter operation 205. FIG. 6C summarizes creation of MFM 167 for determination of a weighting function. FIG. 6F illustrates a portion of a process which applies the weighting function derived from the MFM data to determine each median value. Data in the Mutual Feature Map (MFM) 167 is intensity map data, similar to the initial disparity map data, but which includes structure present in the RGB reference Image 161, including edges and corner features.

The Similarity Map (SM) 166 is a map representation of differences and similarities between the Initial Disparity Map 165 and the RGB reference image 161. SM 166 indicates how structurally similar a disparity map and a reference image are, without including in the SM data the structure of either the disparity map or the reference image. This is to be distinguished from the Mutual Feature Map 167 which contains structure features that can be transferred to a disparity map. The similarity values in SM 166 are used as a basis to determine window sizes to be assigned for each filter operation performed on a disparity map. Thus the Similarity Map determines final specifications for operation of a weighted median filter on a disparity map. A Mutual Feature Map 167 cannot be used for this purpose because it contains structure.

A Structural SiMilarity (SSIM) method, based on the Similarity Map 166, provides measures of the similarity between two images based on computation of an index which can be viewed as a quality measure of one of the images relative to the other image. The other image may be regarded as a standard of quality, i.e., corresponding to an accurate representation of the scene from which the image is derived, e.g., the ground truth. The similarity map 166 is applied to identify areas in a disparity map which could be filtered by relatively large window sizes and areas in the disparity map which could be filtered by smaller window sizes. A window sizing process is provided which applies elements of the Similarity Map 166 to selectively process areas of the Initial Disparity Map 165 having higher similarity values with an individual filter operation based on a larger window size, facilitating faster computational time for the filter operation performed over the entire disparity map; while areas with lower similarity values are processed with an individual filter operation based on a smaller window size, contributing to increased computational time over the entire disparity map. Elements of the Similarity Map 166 applied to selectively process areas of a disparity map may be computed for patches of superpixels or for groups of patches. Embodiments of the method discriminate between patch areas with higher similarity values and patch areas with lower similarity values to more optimally reduce overall processing time required for the filter operations to generate a Filtered Disparity Map 172 as an output of Process Block 5.

Referring to FIG. 6C, in one embodiment, the Similarity Map 166 is created based on multiple functions which provide measures of the similarity between the initial disparity map 165 and the first RGB reference image 161. An exemplary Structural SIMilarity (SSIM) index provides a pixel-by-pixel measure of similarity between the two sets of image data. As noted for the SSIM method, the SSIM index may be regarded as a quality measure of the Initial Disparity Map 165 relative to the first RGB reference image 161, or in comparison to other image data, provided the other image data is of suitable accuracy for achieving acceptable depth map accuracy. The illustrated embodiment of the SSIM index is a function of a luminance term, l, a contrast term, fvc, and a structural term, s, in which D and I are, respectively, the initial disparity map 165 and the first reference RGB image 161. Also, $D_p$ and $I_p$ (referred to as D_p and I_p in the computer code, respectively) are the pixel intensities in the initial disparity map 165 and the first reference RGB image 161, respectively. One embodiment of the Structural SIMilarity (SSIM) index is given by $$SSIM(D,I) = [l(D,I)]^\alpha \cdot [c(D,I)]^\beta \cdot [s(D,I)]^\gamma \quad (I)(11)$$

where:

$$l(Dp, I) = \frac{2\mu_D \mu_I + C_1}{\mu_D^2 + \mu_I^2 + C_1} \quad (II)$$

$$fvc(Dp, I) = \frac{2\sigma_D \sigma_I + C_2}{\sigma_D^2 + \sigma_I^2 + C_2} \quad (III)$$

$$s(Dp, I) = \frac{\sigma_{DI} + C_3}{\sigma_D \sigma_I + C_3}, \quad (IV)$$

and where $\mu_D$, $\mu_I$, $\sigma_D$, $\sigma_I$ and $\sigma_{DI}$ are, respectively, the local means, standard deviations, and cross-covariance for images D and I (e.g., at the level of a patch group, a patch of pixels or at the super pixel level); and $C_1$, $C_2$, $C_3$ are regularization constants for the luminance, contrast, and structural terms, respectively. Terms $\alpha$, $\beta$ and $\gamma$ are exponents for the luminance, contrast, and structural terms, respectively.

Where N is the number of the patches (e.g., of size 11×11) extracted from each image D and I:
(1) the local means for the images D and I may be calculated by applying a Gaussian filter (e.g., of size 11×11 with standard deviation 1.5) as follows:

(a)
$$\mu_D = \frac{1}{N} \sum_{i=1}^{N} D_i \quad (12)$$

(b)
$$\mu_I = \frac{1}{N} \sum_{i=1}^{N} I_i \quad (13)$$

(2) the standard deviations be calculated as follows:

(c)
$$\text{standard deviations in } D = \sigma_D = \left( \frac{1}{N-1} \sum_{i=1}^{N} (D_i - \mu_D)^2 \right)^{\frac{1}{2}} \quad (14)$$

(d)
$$\text{standard deviations in } I = \sigma_I = \left( \frac{1}{N-1} \sum_{i=1}^{N} (I_i - \mu_I)^2 \right)^{\frac{1}{2}} \quad (15)$$

and
(3) the cross covariance may be calculated as (e)
$$\sigma_{DI} = \frac{1}{N-1} \sum_{i=1}^{N} (D_i - \mu_D)(I_i - \mu_I). \quad (16)$$

$C_2$, $C_3$ are regularization constants for the luminance, contrast, and structural terms. In the luminance term, $C_1 = (K_1 L)^2$, L is the dynamic range of the pixel values (e.g., 255 for 8-bit grayscale image) and $K_1$ is a small constant value (e.g., $K_1$=0.01). In the contrast term, $C_2 = (K_2 L)^2$, L is again the dynamic range of the pixel values and $K_2$ is a small constant value (e.g., $K_2$=0.03). In structural term $C_3 = C_2/2$.

Computation of the above luminance, contrast and structural terms II, III and IV to calculate the SSIM index is also described in the literature. See, for example, Wang, et al. "Image Quality Assessment: From Error Visibility To Structural Similarity" IEEE Transactions On Image Processing 13.4 (2004): 600-612. See, also, Z. Wang, et al., "Multi-scale structural similarity for image quality assessment," Invited Paper, IEEE Asilomar Conference on Signals, Systems and Computers, November 2003; and also see Wang et al., "A Universal Image Quality Index," in IEEE Signal Processing Letters, vol. 9, no. 3, pp. 81-84, March 2002.

In one embodiment for performing a weighted median filter operation, the SSIM index is applied to create a SSIM map as the Similarity Map 166, comprising a value $SSIM_{ij}$ for each pair of corresponding pixels $p_{i,j}$ present in both the RGB image 161 and the Initial Disparity Map 165. These SSIM index values are used for adaptive window sizing. Initially the process starts with a relatively small window size $W_{min}$ (e.g., the size 3*3 corresponding to (2j+1) with j=1) as an initial and minimum candidate size for an adaptive window. With $SSICM_{ij}$ denoting the SSIM Index value for one center pixel position inside the current window of the SSIM map, $SSIM_{min}$ is the minimum pixel value inside the current window and $SSIM_{max}$ is the maximum pixel value in the current window. Letting W be the current window size (e.g., 3*3); $W_{max}$ be the maximum size of the adaptive window (e.g., the size 9*9 corresponding to (2j+1) with j=4); and $SSIM_{med}$ be the median pixel value determined for the current window, W, centered about the center pixel position, then: the proper window size is determined using the following steps:

a) If the inequality statement $SSIM_{min} < SSIM_{med} < SSIM_{max}$ is true, then the current window size is the chosen window size for performing a weighted median operation about the center pixel position corresponding to the SSIM position $SSICM_{ij}$.

b) If the inequality statement in step a) is not true, the size of the window is increased to (2j+1) by incrementing j: j=>j+1.

c) Next, steps a) and b) are repeated as necessary until either: (i) $SSIM_{med}$ is between $SSIM_{min}$ and $SSIM_{max}$; or (ii) the maximum window size is reached, in which case the maximum window size is the chosen window size for performing a weighted median operation about the center pixel position corresponding to the SSIM position $SSICM_{ij}$.

Reference to the word "median" in the context of $SSIM_{med}$ is not to be confused with the median attribute of the dynamic joint weighted median filter which calculates median values to construct the Filtered Disparity Map 174.

The "median" associated with SSIM$_{med}$ is in the context of adaptive window sizing and steps a), b) and c), i.e., the selection of a size for a window, W, which is later used during the DJWM filter operation 205.

An advantageous embodiment has been described in which the Similarity Map 166 is derived by applying SSIM indices to create a SSIM map. Generally, applying a median filter with constant window size on an image might remove structural information which should be retained for improved depth map accuracy. The median filter operation may also retain unnecessary information. By choosing a relatively large window size, processing time for the median operation can be reduced, but some valuable information may be removed by operating the filter over a larger window size. On the other hand, by choosing a relatively small window size, the processing time for the entire median operation may be increased and unnecessary information might be retained. Advantageously adaptive window sizing permits a more optimal selection of window sizes as the filter operation progresses over the disparity map. When the window sizes are adaptively chosen in an embodiment which uses the SSIM map as the Similarity Map 166, the Similarity Map provides a measure of how similar corresponding patches in the Initial Disparity Map 165 and the RGB reference image 161 are in terms of structure. Information in the Similarity Map 166 is used to identify the areas of the data array which can advantageously be filtered by larger window sizes and the areas which should be filtered by smaller window sizes to preserve structural information. Ideally this process optimally determines areas with relatively high similarity values that can be filtered with relatively large window sizes for faster computational time, and optimally identifies only those areas with relatively low similarity values that should be filtered with application of smaller window sizes, at the cost of slower computational speeds, to restore or preserve important structural information. The result is an ability to balance a minimization of overall median filter computational time while keeping necessary information to achieve acceptable depth map accuracy.

According to another aspect of the invention, structure similarity of two images (i.e., the mutual-structure) is used to guide a median filtering operation, which is why the DJWMF operation 205 is referred to as a joint filtering process. The operation results in a Filtered Disparity Map 172. With D and I again denoting, respectively, the Initial Disparity Map 165 and the first RGB image 161, $D_p$ and $I_p$ denote the pixel or superpixel intensities in initial disparity map 165 and the first RGB image respectively. The structure similarity between the two images 165 and 161, i.e., as embodied in the exemplary Mutual Feature Map (MFM) 167, may be calculated based on cross covariance, normalized cross correlation, $N(D_p, I_p)$, or least-square regression. See FIG. 503. The MFM 167 is applied during the DJWMF operation 205 on D, the Initial Disparity Map 165. See FIG. 504. This results in transfer of structural information from the reference RGB image 161 to the Initial Disparity Map 165 to restore edges and corners in the Initial Disparity Map 165 with improved efficiency over transferring the entire structure of the RGB image.

In one embodiment, D 165 and I 161 are treated as two ordered signal data arrays, each comprising M samples of pixels. A measure of the actual similarity between two images, based on patches in the images, may be calculated with the normalized cross covariance.

With the ordered arrays of signal data treated in like manner to a time series representation of data, a delay of W samples is iteratively imposed between corresponding data in the depth map image, D, and the reference image, I, to determine the cross-covariance between the pair of signals:

(1)
$$CC(W) = \frac{1}{M-1} \sum_{k=1}^{M} (D_{k-W} - \mu_D)(I_k - \mu_I), \quad (17)$$

where $\mu_D$ and $\mu_I$ are, respectively, for each time series, the mean value of data in the depth map image array and the mean value of data in the reference image array. When normalized, the cross-covariance, CC(W) becomes N(W), commonly referred to as the cross-correlation:

(2)
$$N(W) = \frac{CC(W)}{\sqrt{\sigma(D_p)\sigma(I_p)}}, \quad (18)$$

where $\sigma(D_p)$ and $\sigma(I_p)$ denote the variance of the pixel intensity in D and I, respectively.

After normalization the cross-correlation between D and I is:

(3)
$$N(D_p, I_p) = \frac{\text{cov}(D_p, I_p)}{\sqrt{\sigma(D_p)\sigma(I_p)}}, \quad (19)$$

where $\text{cov}(D_p, I_p)$ is the covariance of patch intensity between D and I. The variance of pixel intensity in the initial depth map and RGB image 161 are denoted by $\sigma(D_p)$ and $\sigma(I_p)$, respectively. The maximum value of $N(D_p, I_p)$ is 1 when two patches are with the same edges. Otherwise $|N(D_p, I_p)| < 1$. Nonlinear computation makes it difficult to use the normalized cross-correlation directly in the process.

An alternate method of performing the nonlinear computations for normalized cross-correlations is based on the relationship between the normalized cross-correlation and the least-square regression to provide a more efficient route to maximizing similarity between images and accuracy in depth map estimates. If we consider H(p) as a patch of superpixels centered at pixel p, then the least-squared regression function ƒ(D,I,) between pixels in the two images D and I may be expressed as:

$$f(D, I, \alpha_p^1, \alpha_p^0) = \Sigma_{q \in H(p)} (\alpha_p^1 D_q + \alpha_p^0 - I_q)^2, \quad (4)(20)$$

where q is a superpixel element in the patch of pixels H(p), and $\alpha_p^1$ and $\alpha_p^0$ are regression coefficients. The function $f(D, I, \alpha_p^1, \alpha_p^0)$ linearly represents an extent to which one patch of superpixels in D 165 corresponds with one patch of superpixels in I 161. The minimum error, which corresponds to a maximum value for $N(D_p, I_p)$, based on optimized values of $\alpha_p^1$ and $\alpha_p^0$, is:

(5)
$$e(D_p, I_p)^2 = \min_{\alpha_p^1, \alpha_p^0} \frac{1}{|H|} f(D, I, \alpha_p^1, \alpha_p^0), \quad (21)$$

Based on Eqns (17) and (21), the relation between the mean square error and normalized cross correlation is:

$$e(D_p, I_p) = \sigma(I_p)(1 - N(D_p, I_p)^2). \quad (6)(22)$$

The relation between the mean square error and normalized cross-correlation is described in Achanta, et al., "SLIC Superpixels Compared to State-of-the-Art Superpixel Methods," *IEEE Transactions on Pattern Analysis and Machine Intelligence*, vol. 34, pp. 2274-2282, 2012.

When $|N(D_p, I_p)| = 1$, two patches only contain mutual structure and $e(D_p, I_p) = 0$.

So, using the same procedure as above:

(7)
$$e(I_p, D_p)^2 = \min_{b_p^1, b_p^0} \frac{1}{|H|} f(I, D, b_p^1, b_p^0), \quad (23)$$

where $\alpha_p^1$ and $\alpha_p^0$ are regression coefficients. Therefore $e(I_p, D_p) = 0$ when $|N(D_p, I_p)| = 1$.

The final patch similarity measure is defined as the sum of the functions defined in Eqns (19) and Eq (21) as: $e(D_p, I_p)^2 + e(I_p, D_p)^2$. Based on the foregoing, both the Mutual Feature Map 167 and the patch similarity are obtained from application of:

$$S(D_p, I_p) = e(D_p, I_p)^2 + e(I_p, D_p)^2 \quad (8A)(24)$$

Based on Eqns. (21) and (22), and considering that $N(D_p, I_p) = N(I_p, D_p)$, the pixel similarity, S, with which the patch similarity is determined, can also be expressed as:

$$S(D_p, I_p) = (\sigma(D_p)^2 + \sigma(I_p)^2)(1 - N(D_p, I_p)^2)^2 \quad (8B)(25)$$

When, for superpixels in corresponding patches, $|N(D_p, I_p)|$ approaches one, $S(D_p, I_p)$ approaches zero, indicating that two patches have common edges. When the patches don't clearly contain common edges, then $\sigma(D_p)$ and $\sigma(I_p)$ are relatively small values and the output of $S(D_p, I_p)$ is a small value.

Based on the above analysis, the Mutual Feature Map 167, also referred to as $S_s$, is the sum of pixel or patch level information:

$$S_s(D, I, \alpha, b) = \Sigma_p(f(D, I, \alpha_p^1, \alpha_p^0) + f(I, D, b_p^1, b_p^0)), \quad (8)(26)$$

where $\alpha$ and $b$ are the regression coefficient sets of $\{\alpha_p^1, \alpha_p^0\}$ and $\{b_p^1, b_p^0\}$, respectively.

The Mutual Feature Map 167 is used for weight allocation. An exemplary and typical choice for weighting allocation is based on the affinity of p and a in the Mutual Feature Map S expressed as:

$$w_{pq} = g(S(p), S(q)) \quad (9)(27)$$

where S(p) and S(q) are features at pixels p and q in S. A reasonable choice for g is a Gaussian function, a common preference for affinity measures:

$$\exp\{-\|S(p) - S(q)\|\} \quad (10)(28)$$

The Initial Disparity Map 165, also referred to as a target image, typically lacks structural details, such as well-defined edges and corner features. The deficiencies may be due to noise or insufficient resolution or occlusions. The DJWMF operation 205 of Process Block 5 restores the missing detail by utilizing the RGB reference image 161 to provide structural guidance by which details missing from the initial disparity map are restored, while avoiding further incorporation of artifact. In the past, filters applied to transfer structural features of a guidance image have considered information in the guidance image without addressing inconsistencies between that information and information in the target image. Hence the operation could transfer incorrect contents to the target image. Prior approaches to avoid transfer of incorrect information have considered the contents of both the target and the reference image used to provide guidance with dynamically changing guidance. For example, in a process that minimizes a global objective function, the guidance signals may be updated during iterative calculations of the objective function to preserve mutually consistent structures while suppressing those structures not commonly shared by both images.

Weighted median filter operations according to the invention can provide for a more optimal restoration of features. With the first stage of disparity map refinement operations utilizing both the Similarity Map (SM) 166 and the Mutual Feature Map (MFM) 167 generated in the Mutual Structure Processing Block 4, the DJWMF operation 205 can selectively and optimally transfer the most useful structural information from the reference RGB image for depth refinement on a patch level. This enables restoration in the Interim Disparity Map 170 of physically important features, corresponding to object details evident in the reference RGB image 161. To this end, filter weightings applied in the median filter operation are dynamically allocated, e.g., with patch level or superpixel level weightings $w_{pq}$ based on $S_s(D, I, \alpha, b)$ and advantageously provided in a joint histogram. Similarities or differences in structure on, for example, a patch level, between the disparity and reference maps can play a more effective role in the weighting process to effect restoration of edges and corners without introduction of additional artifact. Select embodiments of the methods which dynamically apply weightings to the median filter can fill regions of occlusion or depth discontinuity. When pixel data includes large erroneous deviations, the values resulting from the dynamic weighting can be less distorted than values which would result from application of a standard median filter which only base the new pixel value on a value in the defined window. Consequently, edge regions processed with the dynamically weighted median filter can restore a level of sharpness which may not be achievable with a standard median filter or a median filter which does not provide variable weight allocations.

To reduce the relatively expensive computational cost of sorting values in a median filter operation, embodiments of the invention employ histogram techniques to represent the distribution of the image intensities within each adaptive window, i.e., indicating how many pixels in an image have a particular intensity value, V. The histogram is created by incrementing the number of pixels assigned to each bin according to the bin intensity level. Each time a pixel having a particular intensity is encountered, the number of pixels assigned to the corresponding bin is increased by one. For discrete signals the median value is computed from a histogram h(p,.) that provides the population around the position of a center pixel p located at a position (x,y):

$$h_D(p, i) = h_D(i) = \Sigma_{p' \in W_p} \delta(V(p') - i), \quad (9a)(29)$$

where $W_p$ is a local window of dimensions 2j+1 around p, V is the pixel value and i, the discrete bin index, is an integer number referring to the bin position in the histogram. For example, a bin i,j in the histogram has an index i,j corresponding to one value in a monotonically increasing sequence of intensity values, V, each value mapped to an assigned bin. $\delta(.)$ the Kronecker delta function, is one when the argument is zero and is otherwise zero.

There are 2 main iterations in Eqn (29). By way of example, the first iteration may range from 0 to 255, which corresponds to a range of pixel intensity values. For each such iteration there may be a sub-iteration of $(2j+1)^2$ over pixel values in a window (e.g., from 0 to 8 for a 3*3 window $W_p$ of pixels). The following illustration of a median operation can readily be applied to a dynamically weighted median operation as well by including a weighting factor such as ω(p,p') as noted below.

For a window $W_p$, in an image D, the associated histogram h is based on the number of pixels, N, in $W_p$ and with pixel values ranging from 0 to 255. The term $O_{Mid}$ corresponds to the middle pixel in the ordered bin sequence of the N data points:

$$O_{Mid} = \frac{N-1}{2}$$

where N is odd. The median based on the histogram can be computed for a window $W_p$ of exemplary values V $$W = \begin{array}{|c|c|c|} \hline 156 & 89 & 75 \\ \hline 190 & 204 & 89 \\ \hline 89 & 75 & 255 \\ \hline \end{array}$$

as:

```
Function m= medhist (W)
{
// Input: Window W_p storing N pixels
// Output: Median of the window
csum=0; //csum means the cumulative function of the histogram
for i=0 to 255
    for j=0 to N
        h(i) += δ(W(j)-i);   //δ(•) is 1 when the argument is 0, otherwise
        it is 0
    end for
    If hn[i] > 0 then
    csum += hn[i];
```

The above median determination first creates the histogram from the input data set. Then, the cumulative function of the histogram is evaluated by incrementing the index over the example range of pixel values from 0 to 255. When the cumulative function reaches the middle order, $O_{Mid}$, the current index is the median value for the current window data set required.

However, because a standard median filter processes all pixel values in a window equally the operation may introduce artifact such as the giving of curvature to a sharp corner or the removal of thin structures. For this reason, elements in a median filter according to embodiments of the invention are dynamically weighted so that certain pixel values, V, in the windows are, based on affinity, selectively weighted and the filter operation accumulates a series weighted median pixel intensity value for the Filtered Disparity Map 172. In one embodiment, given a weighting function ω(p,p'), the weighted local histogram with weighted pixels p' in a selected window $W_p$ within the disparity map data is given by:

$$h(p,i)=\Sigma_{p' \in W_p} \omega(p,p') \delta(V(p')-i) \qquad (10)(30)$$

where i and δ(.) are as previously stated.

By accumulating h(p,i) the weighted median value is obtained. That is, as described for the unweighted median filter operation, the cumulative function of the histogram h(p,i) in Eqn (30) is evaluated by incrementing the index over the example range of pixel values from 0 to 255. When the cumulative function reaches the middle order, $O_{Mid}$, the current index is the median value for the current window data set required.

For the joint median filter on a depth map D with a group S of segments, the local histogram is defined as:

$$h_D(p,i)=h_D(i)=\Sigma_{p' \in W_p \cap S_p} \delta(D(p')-i), \qquad (12)(31)$$

where $S_p \in S$ is the segment containing pixel p. Image segments in S represent, for example, the edge information of the reference image 161.

For the joint weighted median filter applied to a disparity map D with a group S of segments and a weighting function ω(p,p'), the local histogram is defined as:

$$h_D(p,i)=h_D(i)=\Sigma_{p' \in W_p \cap S_p} \omega(p,p') \delta(D(p')-i) \qquad (3)(32)$$

In the context of a histogram of a window, the word "segment" corresponds to a group of pixels representing a feature like an edge or corner in the reference image.

By accumulating the weighted median filter value is obtained, as described for the unweighted median filter operation.

An exemplary process for applying the Mutual Feature Map 167 in performing the DJWMF operation 205 is described for 3*3 window size operations. When a joint histogram combines colour information with intensity gradient information, a given pixel in an image has a colour (in the discretized range 0 . . . $n_{colour}$–1) and an intensity gradient (in the discretized range 0 . . . $n_{gradient}$–1). The joint histogram for color and intensity gradient contains $n_{colour}$ by $n_{gradient}$ entries. Each entry corresponds to a particular colour and a particular intensity gradient. The value stored in this entry is the number of pixels in the image with that colour and intensity gradient. In the DJWMF operation 205, values inside a window are sorted in order to determine the median. Sorting these values is an expensive computation in an iterative process. It is necessary to sort the values inside the window (e.g., by considering the repeated numbers) and then counting the values to find the median. This process can be performed faster by applying a Joint Histogram. Assuming a pixel q located inside the window in an image D(q) is associated with a feature S(q), and given $N_D$ different pixel values, the pixel value index for D(q) is denoted as d and the pixel value index for S(q) is denoted as s. The total number of different features is denoted as $N_S$. In a 2D joint-histogram H, pixel q is put into the histogram bin H(d, s) in the d-th row and s-th column. Thus, the whole joint-histogram is constructed as:

$$H(d,s)=\#\{q \in R(p) | D(q)=D_d, S(q)=S_s\}, \qquad (33)$$

where # is an operator which counts the number of elements and R(p) denotes the local window radius r of centre pixel p. This counting scheme enables fast weight computation even when the window shifts.

For a disparity map D having a window with values of:

$$D = \begin{array}{|c|c|c|} \hline 5 & 2 & 3 \\ \hline 5 & 5 & 6 \\ \hline 7 & 8 & 9 \\ \hline \end{array}$$

and a Mutual Feature Map, S, having a window with values of:

$$S = \begin{array}{|c|c|c|} \hline 1 & 2 & 3 \\ \hline 4 & 5 & 6 \\ \hline 7 & 8 & 9 \\ \hline \end{array}$$

the joint histogram of D and S has 9*9 size and it contains the number of pixels in the image that are described by a particular combination of feature values. For clarity in reading the matrices, D and S are reshaped as:

$$D = \begin{array}{|c|c|c|c|c|c|c|c|c|} \hline 5 & 2 & 3 & 5 & 5 & 6 & 7 & 8 & 9 \\ \hline \end{array}$$

$$S = \begin{array}{|c|c|c|c|c|c|c|c|c|} \hline 1 & 2 & 3 & 4 & 5 & 6 & 7 & 8 & 9 \\ \hline \end{array}$$

H is the joint histogram of D and S:

$$H = \begin{array}{|c|c|c|c|c|c|c|c|c|} \hline 0 & 0 & 0 & 0 & 0 & 0 & 0 & 0 & 0 \\ \hline 0 & 1 & 0 & 0 & 0 & 0 & 0 & 0 & 0 \\ \hline 0 & 0 & 1 & 0 & 0 & 0 & 0 & 0 & 0 \\ \hline 0 & 0 & 0 & 0 & 0 & 0 & 0 & 0 & 0 \\ \hline 1 & 0 & 0 & 1 & 1 & 0 & 0 & 0 & 0 \\ \hline 0 & 0 & 0 & 0 & 0 & 1 & 0 & 0 & 0 \\ \hline 0 & 0 & 0 & 0 & 0 & 0 & 1 & 0 & 0 \\ \hline 0 & 0 & 0 & 0 & 0 & 0 & 0 & 1 & 0 \\ \hline 0 & 0 & 0 & 0 & 0 & 0 & 0 & 0 & 1 \\ \hline \end{array}$$

For an example interpretation of H, given that the first value of D is 5, for the value 5 in D there are 3 corresponding features in S at locations 1, 4 and 5. So in the joint histogram H, in row 5 there are 3 values of 1 in columns 1, 4 and 5, respectively. The same process is iterated for all the pixels in R. At the end of the process a vector is constructed with the number of occurrences of each pixel based on the feature S. Each cell in the matrix Occurrence is the sum of a row in H:

$$\text{Occurrence} = \begin{array}{|c|c|c|c|c|c|c|c|c|} \hline 0 & 1 & 1 & 0 & 3 & 1 & 1 & 1 & 1 \\ \hline \end{array}$$

Next, the values in the chosen Gaussian weight kernel are multiplied with the values in the matrix Occurrence: G*Occurrence With S representing MFM 167, the weight kernel for each pixel position in the window is calculated as:

$$W_{pq} = \exp\{-\|MFM(p) - MFM(q)\mu\} \quad (34)$$

where p is the centre of the window and q is the value of each pixel. This means that the weight assigned for the pixel position q is the exponential function of the distance between p and q.
Let's consider the distance between p and q as:

$$di = \|MFM(p) - MFM(q)\| \quad (35)$$

Then the weight assigned for the pixel position q is:

$$W_{pq} = \exp\{-di\} = e^{-di} \quad (36)$$

The weight for all the pixels inside the window is calculated using the same process. For the foregoing example, the Gaussian weight kernel is:

$$G = \begin{array}{|c|c|c|} \hline 0.094 & 0.11 & 0.094 \\ \hline 0.11 & 0.14 & 0.11 \\ \hline 0.094 & 0.11 & 0.094 \\ \hline \end{array}$$

To make the interpretation simple, the kernel, G, is reshaped as follows:

$$\begin{array}{|c|c|c|c|c|c|c|c|c|} \hline 0.094 & 0.11 & 0.094 & 0.11 & 0.14 & 0.11 & 0.094 & 0.11 & 0.094 \\ \hline \end{array}$$

Next the values in G are multiplied with the values in matrix Occurrence to provide w, the product of G and the Occurrence:

$$\begin{array}{|c|c|c|c|c|c|c|c|c|} \hline 0 & 0.11 & 0.094 & 0 & 0.42 & 0.11 & 0.094 & 0.11 & 0.094 \\ \hline \end{array}$$

The sum of the reshaped matrix w is 1.032 referred to as $w_s$. Next, a cumulative summation is calculated of the weights in the matrix G until a value $\geq w_s/2$ is reached. which in this example is 0.516. That is, 0.094+0.11+0.094+0.11+0.14=0.5480≥0.516.

The location index of the 0.14 in above summation in the matrix G corresponds to the location of the median value in matrix D. This means that the value 0.14 is located in the $5^{th}$ cell of matrix G. So the median of R is located the $5^{th}$ cell.

The Dynamic Joint Weighted Median Filter operation of Process Block 5, referred to as DJWMF process 205, processes data corresponding to both the Similarity Map 166 and the Mutual Feature Map 167 to produce data values for the Filtered Disparity Map 172. The Filtered Disparity Map 172 has reconstructed features corresponding to depth map structure in the original stereo-pair RGB reference images 161, 162 (14, 14'), but also includes processing artifacts near edges and corners introduced, in part, during the Cost Aggregation operation of Process Block 2, referred to in the figures as Cost Aggregation Process 202. As an example of processing artifacts, neighboring pixels with vastly different pixel intensities, or superpixels of relatively large size, may create an undesired exaggerated "staircase" or "blocky" appearance, commonly known as a "blocky artifacts." Instances of blocky artifact are especially prone to occur along edges and at corners of image objects within the Initial Disparity Map 165 if the segmentation size criterion of the superpixel-wise cost function results in definition of superpixels that cross intensity boundaries or object boundaries within the scene. Generally, when superpixels are defined for cost aggregation, this can introduce visible artifacts at the boundaries between superpixels. Because the cost aggregation process is applied individually in each superpixel, neighboring superpixels aggregate the cost differently. This leads to discontinuities at the superpixel boundaries, referred to as blocky artifact. The series of disparity map images in FIGS. 6A-6C provides a simple example of the extent to which blocky artifact becomes more prevalent as the superpixel size, defined in the Cost Aggregation Process 202, increases. The figures illustrate this based on N, the number of superpixels in the image. The example given is for an image having typical pixel length and width dimensions, e.g., 891×597 (maximum Middlebury benchmark) or 1243× 375 (maximum KITTI benchmark). With N=100 in FIG. 2A, the disparity map has relatively few, but very large, superpixels. As N increases, the superpixel size decreases and the extent of the blocky artifact decreases notably. This is evidenced for several values of N: 100, 1,000, 5000 and 16,000. Referring generally to FIGS. 103E-103G, the Multi-Dimensional Convolution (MDC) Process Block 6, reference 206, mitigates the severity of such processing artifacts, including blocky artifacts, by performing a Normalized Convolution 212 followed by a Normalized Interpolated Convolution (NIC) 214, as described below.[2]

A more detailed illustration of an embodiment of the MDC Process Block 6, reference 206, shown in FIG. 103E, combines smoothing methods and interpolation methods to reconstruct a patch H(p) about a suspect pixel p having an intensity value for which there is a high likelihood of correspondence with processing artifacts. Specifically, the reconstruction of a suspect artifact pixel p is accomplished by modifying the pixel value via smoothing or filtering and/or replacing the pixel value via interpolation; and replacing the suspect invalid pixel data values based on neighboring pixel data values having a low likelihood of correspondence with processing artifacts. Those pixels having data values assessed as having a low likelihood of correspondence with processing artifacts are referred to as valid pixels or in some references certain samples, and the data values are referred to as valid data values.

The intensity values at and near a suspect pixel p are modified based on intensities of neighboring valid pixels, giving the closest neighboring valid pixel data values the most significant influence in assigning a modified intensity value to the suspect pixel or to other pixels in a patch about the suspect pixel p. Applicable methods include filtering, smoothing, and/or interpolation methods and may include mathematical weighting, tapering, or windowing factors which, for example, vary smoothly as a function of proximity of each neighboring pixel to the suspect pixel.

Mathematically, this may be expressed as a convolution $f(x)*g(x)$ of functions $f(x)$ and $g(x)$, which convolution function may be interpreted as a modified, blended, or filtered version of $f(x)$ as modified, blended, or filtered by function $g(x)$. An exemplary expression for the convolution $f(x)*g(x)$ of a function $f(x)$ by a smoothing function $g(x)$ of a discrete variable x is given by $$f(x)*g(x) = \sum_{k=-\infty}^{\infty} f(k)g(x-k), (F-1) \quad (37)$$

where $g(x)$ is referred to as a filter or smoothing operator. The convolution is generally a computationally expensive operation. The convolution $f(x)*g(x)$ for vectors $f(x)$ of length m and $g(x)$ of length n requires on the order of n×m operations per output value. Much research has been performed over the last 30 years with the goal of creating algorithms that take advantage of specific mathematical geometries and operations for a gain in computational efficiency.

In the image processing literature, often no distinction is made between the terms "normalized convolution" and "normalized interpolated convolution." The term "normalized convolution" as used herein is an operation based on a standard kernel $g(x)$ which filters or smoothes the function $f(x)$ and which scales the resulting values by the magnitude of $g(x)$. Alternately, $g(x)$ may be normalized prior to the convolution operation. In contrast to the normalized convolution, the normalized interpolated convolution (NIC) is used to fill gaps and replace invalid data samples based on valid data values, and also scales the resulting values by an additional convolutional product.

According to an embodiment of the invention, the Normalized Interpolated Convolution (NIC) 214 is used in a processing method that allows reconstruction of image data when relatively few valid pixels are available due to, for example, the presence of noise or instrumental error. In the NIC 214, the convolution operation of equation (37) is extended using a component $c(x)$ in order to express the confidence or certainty of each measurement or sample of the signal, where x represents the index of the data. Elements of $c(x)$ corresponding to missing sample values equal 0; and elements of $c(x)$ corresponding to valid data values in $f(x)$ equal 1. Therefore, the certainty associated with signal $f(x)$ is expressed as a map $c(x)$ with the same dimension as $f(x)$. The normalization factor in the interpolated convolution is created by the convolution of this certainty map $c(x)$ with the filter or window $g(x)$, as noted below in the discussion of equation (42). See, Knutson, et al., "Normalized and Differential Convolution Methods for Interpolation and Filtering of Incomplete and Uncertain Data" Computer Vision and Pattern Recognition, 1993. Proceedings CVPR '93, 1993 IEEE Computer Society Conference.

In an example embodiment of the invention, the Normalized Convolution 212 and Normalized Interpolated Convolution (NIC) 214 of Multi-Dimensional Convolution (MDC) Process Block 6, reference 206, are applied to remove image processing artifacts from the Filtered Disparity Map 172 by smoothing the Initial Disparity Map D 165 or Interim Disparity Map 170, filling gaps, and replacing invalid pixel values. The method includes sequential execution of multichannel data transform operations, iterative convolution operations, iterative interpolated convolution operations, and then an inverse data transform operation. A feature of the iterative operations is the approximation of a complex Gaussian blur operation by repeated operation of a much simpler function that imparts computational efficiency. This reconstruction results in Final Disparity Map 174.

In a simplified example embodiment, an interpolation process reconstructs missing data. In this example, a function $f(x)$ is a short, one-dimensional representation of a portion of a sequence of the pixel data of a disparity map in which some data determined to be invalid pixel values are replaced by zero values:

$$f(x)=[x_1;0;0;x_4;x_5;0;x_7;0], \quad (F-2)(38)$$

where $x_i$ are known samples of valid pixel data, and the missing, invalid, or corrupted samples have been replaced with zeros. An exemplary normalized simple smoothing function is:

$$g(x)=[\tfrac{1}{3};\tfrac{1}{3};\tfrac{1}{3}]. \quad (F-3)(39)$$

Convolving the smoothing filter $g(x)$ with $f(x)$ results in a modified one-dimensional representation of a portion of a sequence of the pixel data, referred to as function $f_m(x)$:

$$(F-4)$$

$$f_m(x) = g(x)*f(x) = \left[\frac{x_1}{3}; \frac{x_1}{3}; \frac{x_4}{3}; \frac{x_4+x_5}{3}; \frac{x_4+x_5}{3}; \frac{x_5+x_7}{3}; \frac{x_7}{3}; \frac{x_7+x_1}{3}\right] \quad (40)$$

The modified function $f_m(x)$ demonstrates in its sequence several interpolated, smoothed values in positions where the original function $f(x)$ had missing data.

As introduced previously, in the traditional Normalized Convolution (NC) process that is found in the literature, the convolution operation of equation (37) is extended using a certainty factor c(x) to express the confidence or certainty of each measurement or sample or pixel. The certainty factor c(x) associated with function $f(x)$, for the exemplary portion of a sequence of pixel data of an interim disparity map is expressed as a map identifying locations of valid samples:

$$c(x)=[1;0;0;1;1;0;1;0], \quad \text{(F-5)(41)}$$

where elements of c(x) are zero for missing sample values and one for each known element in $f(x)$ containing valid pixel data values. The convolution of the certainty map c(x) with the smoothing filter g(x) is then calculated to arrive at the normalizing factor:

$$(F\text{-}6)$$
$$c(x)*g(x) = \left[\frac{1}{3}; \frac{1}{3}; \frac{1}{3}; \frac{2}{3}; \frac{2}{3}; \frac{2}{3}; \frac{1}{3}; \frac{2}{3}\right]. \quad (42)$$

The function of equation (40) is next divided by the vector function of equation (42) to arrive at a normalized reconstructed function with missing data replaced by interpolated values, i.e. with filled gaps:

$$(F\text{-}7)$$
$$f(x)_0 = \frac{f(x)*g(x)}{c(x)*g(x)} \quad (43)$$

where a normalized reconstructed function $f(x)_0$ approximates the original signal $f(x)$ but without corrupt or missing values. For the example given, $$(F\text{-}8)$$
$$f(x)_0 = \begin{bmatrix} \frac{x_1}{1}; \frac{x_1}{1}; \frac{x_4}{1}; \\ \frac{x_4+x_5}{2}; \frac{x_4+x_5}{2}; \frac{x_5+x_7}{2}; \frac{x_7}{1}; \frac{x_7+x_1}{2} \end{bmatrix} \quad (44)$$

The interpolated convolution approach reduces to the normalized convolution when the certainty values in c(x) are identically equal. For gray scale images, this is identical to interpolation by convolution using a kernel that retains local DC-component values, as commonly used when resampling images in scaling operations that increase the size of an image.

The certainty factor c(x) may be generalized by allowing values of c(x) from a continuous distribution between zero and one, as opposed to only binary values; this generalized certainty factor c(x) is used to indicate how important or applicable the signals in $f(x)$ are for the analysis at a given point. This allows "locality" to be defined by letting the importance or applicability to decrease with the radius from the current given point, e.g., the suspect pixel location. In this case the applicability vector c(x) becomes equivalent to a mathematical window function (for example, Gaussian, Blackman, or Tukey windows). See, again, Knutson, et al., 1993. The applicability vector reverts to the standard certainty map for an exemplary one dimensional vector. In the case of an image, when the mathematical window refers to a rectangle or boxcar, the smoothing function g(x) is two-dimensional. For an example embodiment, the input data is in the form of the Interim Disparity Map 174, which has the same dimensionality as the image data it is derived from, i.e., the same number of pixels in the same aspect ratio in the same geometrical arrangement. For an image, Equation (38) corresponds to known pixels $x_i$ whose values are the pixel intensity in the Filtered Disparity Map 172, and where pixels that are lacking information or corrupted (i.e. missing data) have values replaced with zeroes.

The convolution and interpolation computation examples are described with one-dimensional (1D) examples to provide a simplified illustration of the concepts applicable to convolution and interpolation for image processing, it being understood that two-dimensional (2D) convolution and interpolation are performed for general image processing. However, convolution in the space of the principal domain of the disparity map image is a computationally expensive operation. To perform a convolution of a two-dimensional Gaussian applicability vector function of radius r=10 on an image having total number of n pixels requires approximately $O = n \times 4r^2$ or ~400 separate computations for every output value.

However, a feature of embodiments of the invention realizes computational advantages by transforming the image into an appropriate domain where the complexity and number of data processing computations are reduced. For example, in the case of a time-series transformed into the Fourier domain, the time-domain operation of convolution becomes a simple point by point multiplication; n×m operations may be reduced to O(n log m) operations. The transformation operation may be performed using Fourier, Laplace, Hilbert, wavelet transforms, or other mathematical transforms. After processing, the data is transformed back to its original domain.

In an exemplary embodiment, the DJWMF image, D, the Filtered Disparity Map 172, is mathematically transformed from a 2-dimensional array of pixel values to another domain $\Psi_w$, such as the spatial frequency domain, to facilitate removal of blocky artifacts within the disparity map. For a uniform discretization $U(\Psi)$ of the original domain $\Psi$, the normalized convolution generates the smoothed function value Fi of a sample $q \in U(\Psi)$ as:

$$(F\text{-}9)$$
$$Fi(q) = \left(\frac{1}{J_q}\right) \sum_{l \in U(\Psi)} D(l) R(t(\hat{q}), t(\hat{l})), \quad (45)$$

where $J_q = \Sigma_{l \in U(\Psi)} R(t(\hat{q}), t(\hat{l}))$ is a normalized factor for pixel q such that $t(\hat{q}) = ct(q)$ and R is an arbitrary kernel, e.g., a box kernel. Here ct(q) implements the domain transformation $\Psi \to \Psi_w$ as:

$$ct(q) = \int_0^q 1 + \Sigma_{k=1}^c |D'_k(x)| dx, q \in \Psi \quad \text{(F-10)(46)}$$

where $D'_k$ is the k-th channel of the disparity map D, i.e., each channel is a map, while $D_k$ refers to the whole disparity map. For example, $D_k$ can be the value of a color channel in some color definition space such as RGB. Defining the isometric transform t as $$t(\hat{q}) = ct(q) = t(q, D_1(q), \ldots, D_c(q)) \quad \text{(F-11)(47)}$$

for $t: \mathbb{R}^{c+1} \to \mathbb{R}$ where $\mathbb{R}$ represents an arbitrary space of dimensionality c+1 channels, then equation (46) defines a warping ct: $\Psi \to \Psi_\omega$, of the signal's 1D spatial domain $\Psi$ to the domain $\Psi_\omega$ by the isometric transform t. For an example of this type of transform, see Tomasi and Manduchi, "Bilateral filtering for gray and color images" Sixth International Conference on Computer Vision, 1998, published in Proceedings of the 1998 IEEE International Conference on Computer Vision, Bombay, India, pp. 839-846. doi:10.1109/ICCV.1998.710815

The arbitrary kernel R in equation (45) may, by way of example, be the box kernel, defined as:

$$R(t(\hat{q}),t(\hat{l}))=\delta\{|(\hat{q})-t(\hat{l})|\leq r\} \quad \text{(F-12)(48)}$$

where r is the kernel radius and δ is a Boolean function returning 1 or 0. R then acts as a smoothing function or filter.

For the normalized convolution, the box filter operation in the transformed domain is performed by the box filter kernel operation on a summed area table (SAT). The SAT is calculated by computing the cumulative sum along the specified dimension of the input data. As shown in FIG. 103F, in an exemplary embodiment the box filter kernel operation is performed twice: initially in the horizontal row direction (or the rows of the image), and then that result is processed in the vertical column direction (or the columns of the image). The two-step procedure is iterated three times, to approximate a Gaussian blur operation performed simultaneously across both dimensions, and providing a gain in computational efficiency over the standard Gaussian blur.

Generally, interpolated surfaces created in an image disparity map according to the invention are smoother than the corresponding ones generated by a normalized convolution operation. The interpolation process estimates the intermediate values, i.e., between discrete samples of a continuing process or a continuous function. The result, based on n values is generation of n+z values, with the z new values specified at appropriate intervals (e.g., pixel positions) of the continuous function, and is applied in these embodiments to correct processing artifacts. The illustrated mathematical interpolation function is a special type of mathematical approximation function that is formulated to provide values that coincide with the sampled data at the interpolation nodes, or discrete sample points, i.e., positions of valid pixel values. The interpolation function may be regarded as a continuous mathematical model of the sampled data, e.g., a mathematically continuous function derived from the discrete sample values.

The interpolation procedure may be placed in the form of a convolution (using the formalism of Keys, 1981, Keys, R. (1981) Cubic Convolution Interpolation for Digital Image Processing. IEEE Transactions on Acoustics, Speech, and Signal Processing, 29, 1153-1160 (https://doi.org/10.1109/TASSP.1981.1163711), for example). The interpolation can then be written as the convolution of the sampled data and an interpolation kernel based on the sampled data. In the implementation described here, the continuous interpolation function itself is defined in the domain $\Psi$, is then transformed into the domain $\Psi_\omega$, using the same transformation as equation (46) and then the equivalent of the convolution operation performed in that domain.

To provide increased continuity and smoothness to the filtered disparity map Fi(q) can be filtered using the continuous interpolation function transformed into the $\Psi_\omega$ domain. This means that the interpolated convolution can filter the result of the normalized convolution as:

$$CCF(q)=\int_{U\Psi}Fi(x)R(t(\hat{q})dx, \quad \text{(F-13)(49)}$$

where R is the normalized interpolation kernel defined as:

$$R(t(\hat{q}),x)=\delta\{|t(\hat{q})-x|\leq r\}/2r \quad \text{(F-14)(50)}$$

for r defining the kernel radius.

In the interpolated convolution, the box filter operation in the transformed domain is again computed by the box filter kernel operating on a summed area table (SAT). However, in this case the SAT is built using the area under the graph, in the transformed domain, of the transformed signal. Again the identical process performed for normalized convolution is employed for the normalized interpolation convolution to implement the box filter, with the box filter is executed twice: an initial pass is performed in the horizontal index direction, and then that result is processed in the vertical index direction. The box filter procedure is iterated three times, thereby approximating a Gaussian blur operation performed simultaneously across both dimensions, but with a gain in computational efficiency.

In the module 6A the normalized kernels are applied in the convolution operation to the input Filtered Disparity Map 172 generating the Interim Disparity Map 174.

An embodiment of a method for removing blocky artifacts according to the Multi-Dimensional Convolution (MDC) Process of Block 6 includes steps to implement the Normalized Convolution module 6A followed by steps to implement the Normalized Interpolated Convolution (NIC) Module 6B. See FIGS. 103F and 103G. With the Filtered Disparity Map 172 input to the Normalized Convolution module 6A, in Step S1-1 a multi-channel domain transform is performed to transform the Filtered Disparity Map 172 from an initial Domain to create a Transformed Interim Disparity Map in a Second Domain. See sub-block B1-2.

In Step S1-4 values for 2D (horizontal row direction and vertical column direction) Box Kernel Operators (block S1-4) are generated. In Step S1-5 the Transformed Version of the Interim Disparity Map B1-2 and the Box Kernel Operators B1-4 are used to perform a Normalized Convolution in the Second Domain in the horizontal row direction, using the horizontal row box kernels and the Transformed Version of the Filtered Disparity Map B1-2 (horizontal (row) components). The horizontal Box Kernel Operators are applied in the horizontal direction after accumulating the sum of the overlapped input data into a summed area table.

In Step S1-6 the Transformed Version of the Interim Disparity Map generated in Step 3 and the Box Kernel Operators from process block S1-4 are used to perform a Normalized Convolution in the Second Domain in the vertical column direction using the vertical column box kernels and the Transformed Version of the Filtered Disparity Map of Block B1-2 vertical column component. The vertical Box Kernel Operators are applied in the vertical direction after accumulating the sum of the overlapped input data into a summed area table.

According to Step S1-7, Step 3 and Step 4 are repeated two additional times for a total of three iterations of the two step Normalized Convolution procedure. In Step S1-8, after the three iterations are completed, the resulting modified Transformed Version of the Interim Disparity Map is transformed back into the initial domain, resulting in the First Interim Disparity Map 174. This approximates a Gaussian blur operation applied to the Filtered Disparity Map 172, but the approximation requires fewer computational steps and results in reduced processing time compared to that of a Gaussian blur operation.

In the Normalized Interpolated Convolution Module 6B of MDC Process Block 6, the normalized interpolation kernels are applied in the interpolated convolution operation to the input First Interim Disparity Map 174 to generate the Final Disparity Map 176. The First Interim Disparity Map 174 generated in Module 6A is provided as an input to the Normalized Interpolated Convolution module 6B. In Step S2-1 a multi-channel domain transform is performed on the transformed First Interim Disparity Map 174 to generate a Transformed Version of the First Interim Disparity Map 174 in the Second Domain. See sub-block B2-2.

In Step S2-3 the First Interim Disparity Map 174 is used to create the values for the 2D Certainty Map. See sub block B2-4. In Step S2-5 the Interim Disparity Map 174 is input to create the values for the 2D (horizontal row direction and vertical column direction) Interpolated Box Kernel Operators. See sub-block B2-6. In Step S2-7, using (i) the horizontal component of the Transformed Version of the Interim Disparity Map 174 in sub-block B2-2, (ii) the horizontal row Interpolated Box Kernel Operators of sub-block B2-6, and (iii) the Certainty Map of sub-block B2-4: a Normalized Interpolated Convolution is performed in the second domain in the horizontal row direction. The horizontal Interpolated Box Kernel Operators of sub-block B2-6 are applied in the horizontal direction after accumulating the sum of the overlapped input Transformed First Interim Disparity Map S2-2 and Certainty Map S2-4 into respective summed area tables.

In Step S2-8, using (i) the vertical column component of the Transformed Version of the First Interim Disparity Map 174, (ii) the vertical column Interpolation Box Kernel Operators of sub-block B2-6, and (iii) the Certainty Map of sub-block B2-4: a Normalized Convolution is performed in the second domain in the vertical column direction. The vertical Interpolated Box Kernel Operators of sub-block B2-6 are applied in the vertical direction after accumulating the sum of the overlapped input Transformed First Interim Disparity Map S2-2 and Certainty Map S2-4 into respective summed area tables.

According to Step S2-9, the Steps S2-7 and S2-8 are repeated two additional times for a total of three iterations of the two step Normalized Interpolated Convolution procedure. In Step S2-10, after the three iterations are completed, the resulting version of the Interim Disparity Map in the Second Domain is transformed back to the Initial Domain, producing the Final Disparity Map 176. This approximates a Gaussian blur operation applied to the Interim Disparity Map 174 where invalid pixels have been replaced with interpolated pixel values. This approximates a Gaussian blur operation applied to the Interim Disparity Map 174, but the approximation requires fewer computational steps and results in reduced processing time compared to that of a Gaussian blur operation.

The first interpolated kernel is applied along the horizontal direction and the second interpolated kernel is applied along the vertical direction. The output values represent the result of the interpolation kernel affected by the result of the normalized kernel. Applying the disclosed process on data of the Filtered Disparity Map 172, e.g., transforming the disparity map into an appropriate domain and performing both the normalized convolution and the normalized interpolation convolution, generates a smooth disparity map essentially free of blocky artifacts. A prior art calculation using two camera parameters: (1) a distance between a pair of stereo cameras and (2) a stereo camera focal length, is used to calculate the Final Depth Map 180 from the Final Disparity Map 176.

Comparing the Final Disparity Map 176 created in Multi-Dimensional Convolution Process Block 6 to the predecessor Initial Disparity Map 165 created in Block 3, the Final Disparity Map 174 advantageously exhibits restored edges and corners, and reconstructed parts, whereas the former is characterized by missing structure. Blocky artifacts are not present in the Final Disparity Map 180. In other words, with the described methods for operating on the Filtered Disparity Map 172 greatly improved quality results in the final disparity map. This improvement in the disparity map directly affects calculation of specific depths of objects of primary interest in the images, reducing the number of false positives in detection of specific depths.

The depth estimation process is useful in a wide number of system applications, including three dimensional image reconstruction, three dimensional imaging, object segmentation, autonomous navigation (e.g., drones and aircraft generally, road vehicles, and, generally, situations in which it is desirable to estimate distance to an object. A system running the depth estimation process may be embedded with other image based systems such as used for object detection and classification. See U.S. patent application Ser. No. 15/591,321, "Multi-Camera Vision System and Method Of Monitoring", filed May 10, 2017 and U.S. patent application Ser. No. 15/654,465, filed Jul. 19, 2010 "Portable System Providing Augmented Vision of Surroundings", each of which is assigned to the assignee of the present application and hereby incorporated by reference. Other applications include augmented reality and integration with consumer electronics products equipped with cameras, like smart phones, to bring artistic effects such as Bokeh.

The depth estimation process can be embodied within an embedded signal processing unit, or equivalent, and integrated with a digital camera system to provide real-time depth/disparity maps of an automotive scene. Such maps are useful for a range of automotive applications, including pedestrian detection, vehicle detection and road/lane identification. The disclosed depth estimation methods can be embedded to augment these and other automotive vision systems.

In one example, the afore described depth estimation process is employed to complement an automotive vision system (AVS) based on advanced object detection technology as described in US filed applications. The object detection AVS can provide the location and estimated range of detected objects to a central processing unit which can compare these data with a corresponding depth map. The information from the depth estimation process can confirm or refine precision in distance determinations for detected objects such as pedestrians and other vehicles. Advantageously alert information may be sent to vehicle collision avoidance systems and emergency braking systems when a trigger event is imminent.

In other embodiments, where the depth estimation process may not be supported with sufficient resources to operate on full size image frames at real-time rates (e.g. when a wide-field, high resolution 4K or 8K camera system is deployed), the algorithm may be applied selectively to regions of interest (ROI) within the imaged frame. These ROIs can be based on the detected objects and surrounding areas, as provided by the advanced object detection AVS.

In still other applications the depth estimation process refines performance of other in-vehicle systems. For example, in a vehicle with a 360 degree multi-camera surround vision system the depth estimation process provides detailed range information for persons approaching the vehicle. In the context of a keyless entry system it is desirable to unlock the vehicle when a person with a verified wireless keyfob approaches one of the vehicle doors. However, when a person is beyond 1-2 steps from the vehicle then the locking mechanism should also be engaged. Yet it can be difficult to accurately gauge distances based solely on, for example, the wireless signal strength (e.g., if the battery is weak) but the embedded depth estimation process, when coupled with a 360° multi-camera vision system can solve this problem. See US 20120019613 and US20120019614 which are incorporated herein by reference.

In another embodiment the depth estimation process is combined with an emergency braking/collision warning (EBCW) system. The information generated by the depth estimation process is communicated to the EBCW system when it detects, for example, that a large region of the central portion of the field of vision is very close to the vehicle. The definition of 'very close' will depend on the speed of the vehicle, but at typical urban speeds (e.g., 30 mph) the distance might be on the order of ten to fifteen meters; and, if the region comes closer than, for example, 10 meters, then an active audio alarm is sounded and, if the separation distance continues to diminish, then emergency braking procedures are initiated. As the warning level becomes more elevated, the emphasis of the depth estimation processing can shift to the central region of the image frame to provide faster processing time needed to generate updated information on the separation distance for the object of interest.

A multi-camera 360° surround vision system for a vehicle can stitch images from adjacent cameras to generate a 360° view around the vehicle. The information from two cameras in the system can also provide a stereo image pair suitable for input to the depth estimation process to determine a more accurate range of distance to the subject than may be possible using object detection alone. Also, use of separate image frames from a panoramic sweep may be used to generate a pseudo stereo image pair for the depth estimation process. See, again, US 20120019613 & 20120019614, hereby incorporated by reference, which disclose techniques applicable to assist in generating stereo image pairs suitable for input to the depth estimation process.

Referring to FIG. 106, an exemplary system 220 includes first and second cameras 230, 232 mounted on a vehicle 236. The first camera 230, positioned on the left side of the vehicle, provides a first stream of image data through an image pipeline 234 in which it undergoes local processing, e.g., for object detection, in processing unit 238. This is followed by further processing, including a detection filter stage 244 and a metadata detection stage 248, which information is provided, with a series of image frames 252, to interface logic 254.

The second camera 232, positioned on the right side of the vehicle, provides a second stream of image data through a second image pipeline 240. A stereo pre-processing unit 260 receives image data from pipelines 234 and 240 where it selectively undergoes treatments such as cropping and filtering, e.g., to reduce the field over which object depth estimation is performed. The preprocessed image data is then processed in a stereo image matching unit 264 which comprises processing stages 201, 202 and 203 as summarized in FIG. 1 to generate an initial disparity map 165 and an initial depth map 270. Post processing unit 274 comprises processing stages 204, 205 and 206 to generate an optimized, final disparity map 174 and an optimized final depth map 180.

The main outputs from the single-camera processing and stereo processing pipelines are received by interface logic 254 which ports the differing types of data to a central vehicular processing unit 258 for selective dissemination to vehicle subsystems (e.g., emergency braking system 264, keyless entry system 266, pedestrian detection system 268, vehicular security system 270) in support of multiple functions controlled by the central vehicular processing unit 258. Depending on monitored conditions (e.g., determining whether an object distance has become less than a pre-defined distance from the vehicle 236), the unit sends various commands or updates to the vehicle subsystems. The unit may also send commands to the processing units in the image pipelines. In one example, the central vehicular processing unit 258 may decide to perform processing on a smaller image region in order to enhance depth accuracy or reduce processing time required to send information to the emergency braking system 264. The central vehicular processing unit 258 may then send a command to the pre-processing unit 260 to crop a particular region of an image prior to depth map processing so that processing is only performed on a smaller portion of the image.

Generally, input from the central processing unit 258 can adapt the crop region the main image frame for more selective depth map processing. With a smaller selected region more detailed processing is possible and faster processing (higher frame rate) becomes possible. The system 220 may be in implemented with other processing configurations and other filtering and processing blocks may be incorporated on both single-camera and stereo-camera-pair processing workflows.

The claimed invention is:

1. A method for improving accuracy of depth map information derived from image data descriptive of a scene where pixels of such image data, acquired with one or more image acquisition devices, each have an assigned intensity value, the method comprising:
    performing a matching cost optimization by iteratively refining disparities between corresponding pixels in the image data and using optimization results to create a sequence of first disparity values for an initial disparity map for the scene based in part on a superpixel-wise cost function;
    performing a guided filter operation on the first disparity values by applying other image data containing structural details that can be transferred to the first disparity values to restore degraded features or replace some of the first disparity values with values more representative of structural features present in the image data descriptive of the scene,
    the guided filtering operation performed by applying a series of weighted median filter operations to pixel intensity values in the sequence of first disparity values so that each median filter operation replaces a member in the sequence of first disparity values with a median intensity value, where each median intensity value is based on intensity values in a group of pixels within a window of pixels positioned about said member in the sequence,
    each window being of a variable size to include a variable number of pixels positioned about said member in the sequence, where selections of multiple ones of the window sizes are based on a measure of similarity between the first disparity values and said other image data, and wherein the series of weighted median filter operations provides a new sequence of disparity values for a refined disparity map or from which a depth map of improved accuracy can be created.

2. The method of claim 1 where the other image data applied to perform the guided filtering operation comprises a portion of the pixel image data acquired with the one or more image acquisition devices.

3. The method of claim 1 where the depth map information is derived from stereo image data comprising data from first and second RBG reference images descriptive of the scene and said other image data containing structural details applied to perform the guided filtering operation comprises data from one of the RBG reference images.

4. The method of claim 1 where the series of median filter operations are weighted median filter operations and multiple ones of the window sizes are selected based on a similarity index values.

5. The method of claim 1 where multiple ones of the window sizes are selected based on measures of differences and similarities between data in the sequence of first disparity values for the initial disparity map and data in one the RGB reference images.

6. The method of claim 1 where multiple ones of the window sizes are selected based on one or more measures of similarity between two sets of image data.

7. The method of claim 6 where the two sets of image data comprise the first disparity values and said other image data.

8. The method of claim 1 where:
multiple ones of the window sizes are selected based on one or more measures of similarity between the first disparity values and said other image data; and
the one or more measures of similarity are based on at least one feature taken from the group consisting of luminance, contrast and structure.

9. The method of claim 8 where the measures of similarity are expressable as a map providing pixel by pixel measures of similarity between the two sets of image data.

10. The method of claim 8 where the measures of similarity are calculated in accord with $$SSIM(D,I) = [I(D,I)]^\alpha \cdot [c(D,I)]^\beta \cdot [s(D,I)]^\gamma,$$

where D and I are, respectively, the sequence of first disparity values for the initial disparity map and data values from the image data descriptive of a scene and acquired with said one or more image acquisition devices,
where l, fvc and s are, respectively, luminance, contrast and structural terms and
where α, β and γ are exponents for the luminance, contrast, and structural terms, respectively.

11. A method for performing a filter operation on a sequence of data values which are a subset in a larger plurality of data values derived from acquisitions with one or more devices, the method comprising:
performing a series of filter operations on at least some values in the sequence and replacing each of the multiple ones of the values in the sequence with a new value resulting from the filter operation,
where each new value is based on values in a group containing a number of other data values in the sequence and where the number of data values in each group of values is variable and definable in terms of a selectable dimension in a range of window dimensions, and where the window dimensions vary among multiple groups based on a measure of similarity between values in the sequence and other values in the larger plurality of data values, and
where the larger plurality of data values includes image data descriptive of a scene acquired with one or more image acquisition devices.

12. The method of claim 11 where:
the larger plurality of data values includes first and second RGB images comprising image data descriptive of a scene acquired with multiple image acquisition devices; and
each new value is based on values in a different group containing a number of other data values in the sequence.

13. The method of claim 11 where the sequence of data values comprises disparity map data values for an initial disparity map for the scene created from the image data with a matching cost optimization based in part on a superpixel-wise cost function.

14. The method of claim 11 where the filter operation is a median filter operation.

15. The method of claim 11 where the filter operation is a weighted median filter operation.

16. The method of claim 11 where each new value is a median intensity value based on values in the plurality of data values different from data values in the sequence.

17. The method of claim 11 where each new value is a median intensity value based on RBG image data in the plurality of data values different from data values in the sequence.

18. The method of claim 11 where each group of values corresponds to a different set of pixel image data within a two dimensional window positioned about a pixel position for which a value is replaced by a new value based on the filter operation.

19. A method of defining a series of sizes of adaptive windows, each for use in a filter operation performed on data values for a disparity map, D, corresponding to a scene represented by a reference image I, each filter operation replacing a different data value associated with the disparity map with a new value to improve depth map accuracy for the scene, comprising:
calculating data values for the disparity map associated with the scene;
providing data values for the reference image;
providing a plurality of values, S, collectively corresponding to a similarity map, each value, S, indicative of a level of similarity between a portion of the disparity map data values and a corresponding portion of the reference image data values;
applying the values, S, to determine a series of windows of variable sizes, each window in the series for use in a different filter operation performed on the disparity map data values;
with W designating current window size under evaluation:
defining a smallest window size $W_{min}$ of dimension (2j+1) by (2j+1) where $j=j_{min}$;
defining a largest window size $W_{max}$ of dimension (2j+1) by (2j+1) where $j=j_{max}$;
for each pixel position $P_{i,j}$ in the disparity map, performing a test with the inequality statement $$SSIM_{min} < SSIM_{med} < SSIM_{max}$$

for each corresponding pixel position $S_{i,j}$ in the similarity map beginning with the smallest window size, where:
$SSIM_{min}$ is the minimum pixel value inside the current window, W
$SSIM_{max}$ is the maximum pixel value inside the current window, W and
$SSIM_{med}$ is the median pixel value determined for the current window, W; and concluding that:
If the inequality statement is true, then the current window size is the chosen window size for performing a weighted median operation about the pixel position $P_{i,j}$ in the disparity map corresponding to the similarity map pixel position $S_{i,j}$; and
If the inequality statement in step a) is not true, increasing the size of the window by incrementing j to j+1; and repeating steps a) and b) until either:

(i) $SSIM_{med}$ is between $SSIM_{min}$ and $SSIM_{max}$, in which case the current window size is the chosen window size for performing a weighted median operation about the pixel position $P_{i,j}$ in the disparity map corresponding to the similarity map pixel position $S_{i,j}$, or (ii) the maximum window size is reached, in which case the maximum window size is the chosen window size for performing the weighted median operation about the pixel position $P_{i,j}$ in the disparity map corresponding to the similarity map pixel position $S_{i,j}$.

20. A method for improving accuracy of depth map information derived from image data descriptive of a scene, comprising:

performing a matching cost optimization by iteratively refining disparities between corresponding pixels in the image data and using optimization results to create a sequence of initial disparity map data values for an initial disparity map for the scene;

creating a Mutual Feature Map data based on the initial disparity map data values and the image data descriptive of the scene;

applying the Mutual Feature Map data to create a series of weighting functions representing structural details that can be transferred to the first disparity values to restore degraded features or replace some of the first disparity values with values more representative of structural features present in the image data descriptive of the scene, including applying a series of weighted median filter operations in which a weight kernel based on the Mutual Feature Map data is applied to assign a weighting factor to each pixel position in a weighted median filter operation, whereby each median filter operation replaces a member in the sequence of first disparity values with a median intensity value, where each median intensity value is based on intensity values in a group of pixels within a window of pixels positioned about a data value in the sequence.

* * * * *